US012645213B2

(12) United States Patent
Platonov et al.

(10) Patent No.: US 12,645,213 B2
(45) Date of Patent: *Jun. 2, 2026

(54) USER INTERFACE (UI) AUTOMATION TROUBLESHOOTING SYSTEMS AND METHODS

(71) Applicant: UiPath Inc., New York, NY (US)

(72) Inventors: Marian Platonov, Bellevue, WA (US); Gheorghe C. Stan, Buchare (RO); Ion Miron, Buchare (RO)

(73) Assignee: UiPath Inc., New York, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/633,737

(22) Filed: Apr. 12, 2024

(65) Prior Publication Data

US 2025/0321817 A1      Oct. 16, 2025

(51) Int. Cl.
*G06F 11/00*        (2006.01)
*G05B 23/02*        (2006.01)
*G06F 11/07*        (2006.01)
(52) U.S. Cl.
CPC ..... *G05B 23/0256* (2013.01); *G05B 23/0216* (2013.01); *G06F 11/0766* (2013.01); *G06F 11/079* (2013.01)
(58) Field of Classification Search
CPC .............. G06F 11/0766; G06F 11/079; G06F 11/0793; G05B 23/0256; G05B 23/0216; G06N 20/00
See application file for complete search history.

(56) References Cited

U.S. PATENT DOCUMENTS

| | | | | |
|---|---|---|---|---|
| 9,552,249 B1 * | 1/2017 | James | ................. | G06F 11/0793 |
| 10,654,166 B1 | 5/2020 | Hall | | |
| 10,705,948 B2 * | 7/2020 | Ramasamy | ........... | G06F 11/366 |
| 11,157,397 B2 * | 10/2021 | Ramasamy | ......... | G06F 11/3668 |
| 11,232,170 B1 * | 1/2022 | Dines | ................. | G06F 16/9574 |
| 11,233,861 B2 | 1/2022 | Hall | | |
| 11,281,362 B1 * | 3/2022 | Dines | ................. | G06F 3/04842 |

(Continued)

OTHER PUBLICATIONS

Salesforce, "Automation Studio Errors," https://help.salesforce.com/s/articleView?id=sf.mc_as_automation_studio_errors.htm, Feb. 5, 2024.

(Continued)

*Primary Examiner* — Jonathan D Gibson
(74) *Attorney, Agent, or Firm* — Law Office of Andrei D Popovici, PC

(57) ABSTRACT

In some embodiments, a troubleshooting module executes on a host machine alongside an instance of a robotic process automation (RPA) robot that carries out an automation workflow. The troubleshooting module is configured to detect an automation failure and in response, to carry out a forensic investigation to determine a cause of the malfunction. Exemplary causes detected by the troubleshooter include focus theft and an inadvertent file lock. The troubleshooting module is further configured to identify a culprit (i.e., software entity causing the respective failure) and to communicate a descriptor of the culprit to a user, for instance by way of a failure notification displayed on a screen of the respective host machine or within an administration interface exposed by an RPA conductor orchestrating the execution of multiple RPA robots.

21 Claims, 10 Drawing Sheets

(56) References Cited

U.S. PATENT DOCUMENTS

| | | | | |
|---|---|---|---|---|
| 11,281,521 | B1 * | 3/2022 | Petkar | G06F 11/0751 |
| 11,307,876 | B1 * | 4/2022 | Leonard, II | G06F 3/0482 |
| 11,593,709 | B2 * | 2/2023 | Singh | G06N 5/045 |
| 11,635,977 | B2 | 4/2023 | Munteanu | |
| 11,733,668 | B2 | 8/2023 | Hall | |
| 11,734,104 | B2 | 8/2023 | Dines | |
| 12,141,045 | B2 * | 11/2024 | Sethi | G06F 11/3476 |
| 12,190,143 | B2 * | 1/2025 | Paini | H04L 9/0861 |
| 12,263,593 | B2 * | 4/2025 | Singh | G06Q 10/04 |
| 12,314,748 | B2 * | 5/2025 | Ma | G06F 9/45558 |
| 2003/0061007 | A1 * | 3/2003 | Sigl | G05B 19/4184 |
| | | | | 702/185 |
| 2018/0074931 | A1 * | 3/2018 | Garcia | G06F 11/3409 |
| 2018/0370033 | A1 * | 12/2018 | Geffen | G06F 16/00 |
| 2019/0129827 | A1 * | 5/2019 | Ramasamy | G06F 11/3668 |
| 2021/0303381 | A1 * | 9/2021 | Baldassarre | G06N 5/04 |
| 2021/0342216 | A1 * | 11/2021 | Dines | G06F 11/0706 |
| 2022/0032470 | A1 * | 2/2022 | Singh | B25J 13/006 |
| 2022/0114044 | A1 * | 4/2022 | Singh | G06F 9/453 |
| 2022/0188181 | A1 * | 6/2022 | Saha | G06F 11/0793 |
| 2022/0245479 | A1 * | 8/2022 | Goldberg | G06Q 30/0206 |
| 2022/0350723 | A1 * | 11/2022 | Dines | G06F 11/3006 |
| 2022/0355473 | A1 * | 11/2022 | Mircea | G06F 11/3696 |
| 2022/0357733 | A1 * | 11/2022 | Crane | G05B 23/0281 |
| 2023/0236851 | A1 | 7/2023 | Novitchi | |
| 2024/0045780 | A1 * | 2/2024 | Aziz | G06Q 30/015 |
| 2024/0311226 | A1 * | 9/2024 | Meenakshisundaram | |
| | | | | G06F 11/079 |
| 2025/0321817 | A1 * | 10/2025 | Platonov | G06F 11/0766 |

OTHER PUBLICATIONS

Pyramid Systems, "Getting to Know Robotic Process Automation," https://pyramidsystems.com/robotic-process-automation/, Feb. 5, 2024.
Uipath Forum, "Error message: The process cannot access the file," https://forum.uipath.com/t/error-message-the-process-cannot-access-the-file-because-it-is-being-used-by-another-process/611989/2, Sep. 2023.

* cited by examiner

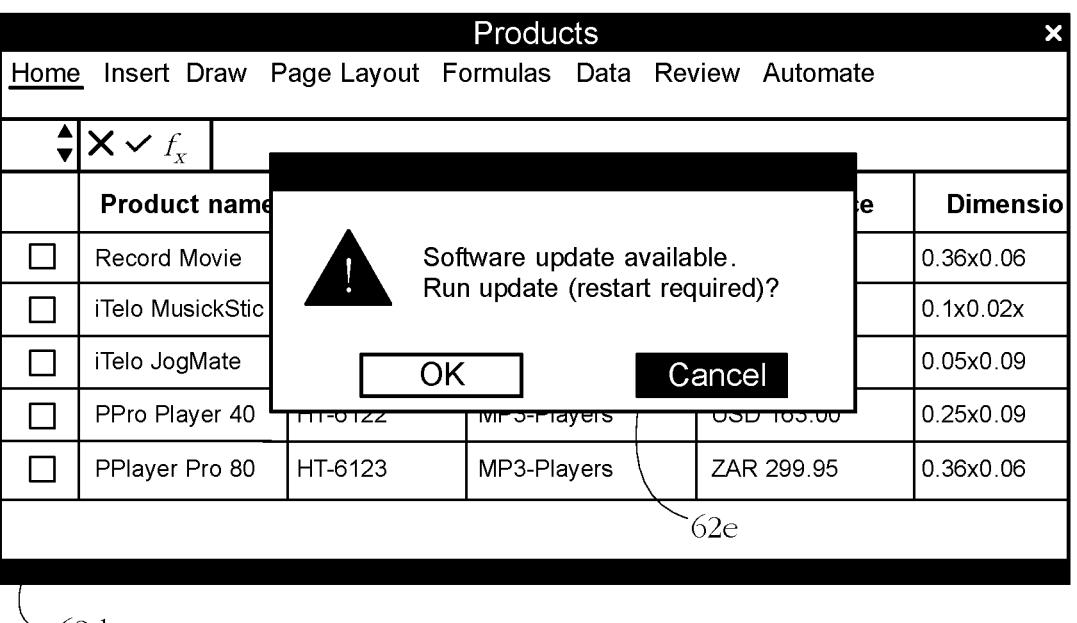

| | Product name | | | e | Dimensio |
|---|---|---|---|---|---|
| ☐ | Record Movie | | | | 0.36x0.06 |
| ☐ | iTelo MusickStic | | | | 0.1x0.02x |
| ☐ | iTelo JogMate | | | | 0.05x0.09 |
| ☐ | PPro Player 40 | HT-6122 | MP3-Players | USD 163.00 | 0.25x0.09 |
| ☐ | PPlayer Pro 80 | HT-6123 | MP3-Players | ZAR 299.95 | 0.36x0.06 |

*Products* — Home  Insert  Draw  Page Layout  Formulas  Data  Review  Automate

✕ ✓ $f_x$

Software update available.
Run update (restart required)?

OK    Cancel

🔒 https://gammaair.com/boarding-check.html

Gamma Airlines

My Trips
Boarding ◄
Receipts
Contact

Passenger Info

First Name

Last Name

Gender ▼

Date of birth
MM/dd/yyyy

Passport No.

62g

Expiration date
MM/dd/yyyy

We use cookies to improve your browsing experience.

Read our privacy policy here.

Accept all    Personalize    Reject all

FIG. 7

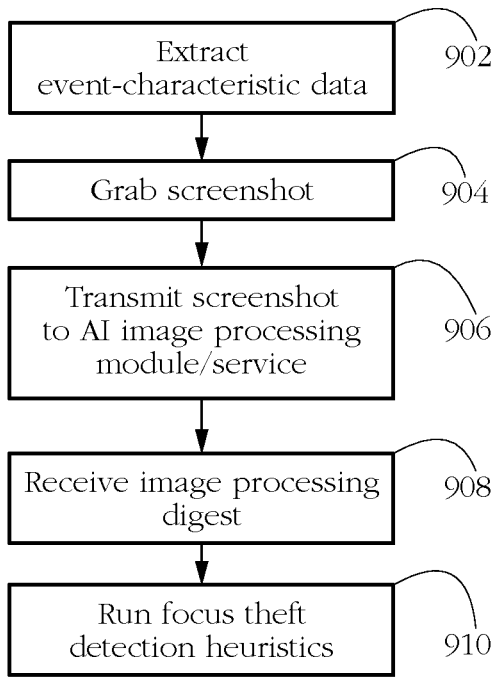

Extract
event-characteristic data    902

Grab screenshot    904

Transmit screenshot
to AI image processing
module/service    906

Receive image processing
digest    908

Run focus theft
detection heuristics    910

FIG. 9

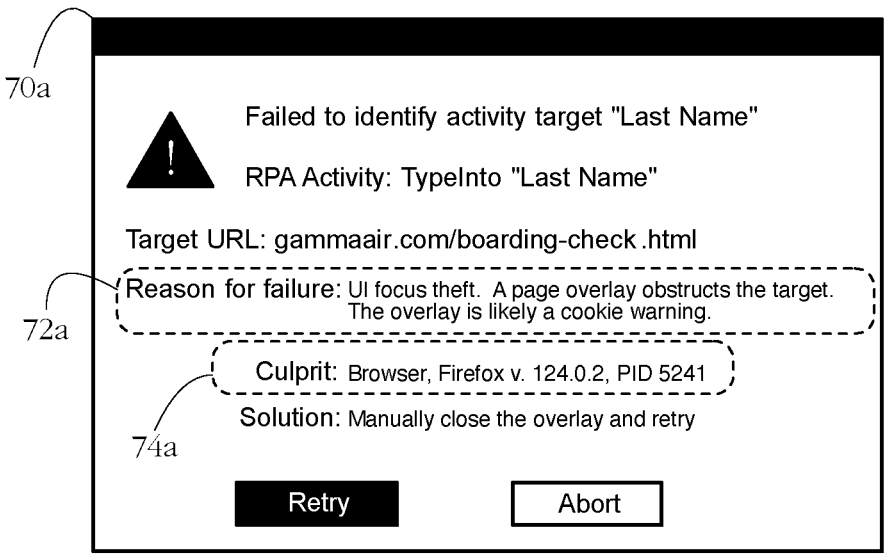

70a

Failed to identify activity target "Last Name"

RPA Activity: TypeInto "Last Name"

Target URL: gammaair.com/boarding-check .html

Reason for failure: UI focus theft.  A page overlay obstructs the target.
The overlay is likely a cookie warning.

72a

Culprit: Browser, Firefox v. 124.0.2, PID 5241

Solution: Manually close the overlay and retry

74a

Retry    Abort

USER INTERFACE (UI) AUTOMATION TROUBLESHOOTING SYSTEMS AND METHODS

BACKGROUND OF THE INVENTION

The invention relates to robotic process automation (RPA), and in particular to facilitating the development and use of RPA robots.

RPA is an emerging field of information technology aimed at improving productivity by automating repetitive computing tasks, thus freeing human operators to perform more intellectually sophisticated and/or creative activities. Notable tasks targeted for automation include extracting structured data from documents and web pages and interacting with user interfaces, for instance filling forms and manipulating spreadsheets, among others.

Complex RPA projects come with specific challenges. The design of automations is generally carried out by specialized RPA developers, which often differ from the clients who ultimately use the respective automations. Furthermore, due to the rapid uptake and multiple advantages of cloud technologies, RPA automations often do not execute on a client's local machine, and thus may require knowledge of in-cloud robot deployment and administration. Overall, the maintenance, troubleshooting, and occasional customization of RPA products and solutions may involve multiple parties, making them relatively slow and costly.

A distinct prong of RPA development is directed at simplifying the programming and management of software robots and automations, with the ultimate goal of extending the reach of RPA technology to 'citizen developers', i.e., users that lack advanced programming skills or specialized training. There is therefore a strong interest in making all aspects of RPA more user-friendly and intuitive, to attract a broad audience of developers and users.

SUMMARY OF THE INVENTION

According to one aspect, a computer system comprises at least one hardware processor configured to execute a troubleshooter module communicatively coupled to a robotic process automation (RPA) robot configured to execute an RPA activity mimicking a human interaction with a user interface (UI) exposed by the computer system. The troubleshooter module is configured to, in response to a failure of the RPA robot to execute the RPA activity, determine whether the failure was caused by UI focus theft. The troubleshooter module is further configured to, in response to determining that the failure was caused by UI focus theft, identify a culprit software entity causing the UI focus theft, and initiate a display of a failure notification to a user, the failure notification including an indicator of a cause of the failure and an identifier of the culprit software entity.

According to another aspect, an RPA troubleshooting method comprises employing at least one hardware processor of a computer system to execute a troubleshooter module communicatively coupled to an RPA robot configured to execute an RPA activity mimicking a human interaction with a UI exposed by the computer system. Executing the troubleshooter module comprises, in response to a failure of the RPA robot to execute the RPA activity, determining whether the failure was caused by UI focus theft. Executing the troubleshooter module further comprises, in response to determining that the failure was caused by UI focus theft, identifying a culprit software entity causing the UI focus theft, and initiating a display of a failure notification to a user, the failure notification including an indicator of a cause of the failure and an identifier of the culprit software entity.

According to another aspect, a non-transitory computer-readable medium stores instructions which, when executed by at least one hardware processor of a computer system, cause the computer system to execute a troubleshooter module communicatively coupled to an RPA robot configured to execute an RPA activity mimicking a human interaction with a UI exposed by the computer system. The troubleshooter module is configured to, in response to a failure of the RPA robot to execute the RPA activity, determine whether the failure was caused by UI focus theft. The troubleshooter module is further configured to, in response to determining that the failure was caused by UI focus theft, identify a culprit software entity causing the UI focus theft, and initiate a display of a failure notification to a user, the failure notification including an indicator of a cause of the failure and an identifier of the culprit software entity.

BRIEF DESCRIPTION OF DRAWINGS

The foregoing aspects and advantages of the present invention will become better understood upon reading the following detailed description and upon reference to the drawings where:

FIG. 6 illustrates an exemplary popup window stealing focus from an RPA target window, according to some embodiments of the present invention.

FIG. 7 shows another example of focus stealing according to some embodiments of the present invention.

FIG. 9 shows another exemplary sequence of steps performed by the troubleshooting module to detect focus stealing according to some embodiments of the present invention.

FIG. 10 shows an exemplary failure notification according to some embodiments of the present invention.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
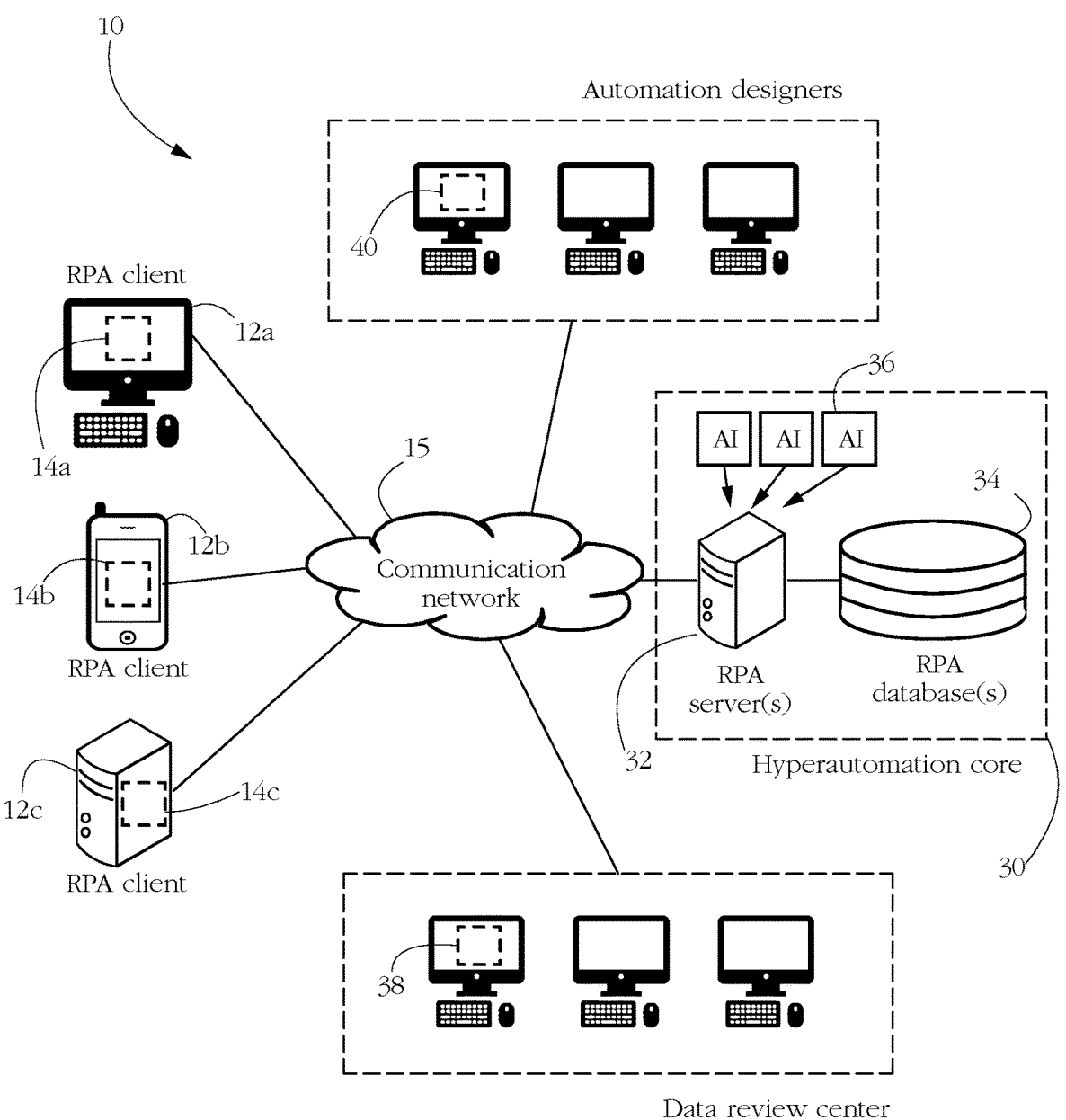
FIG. 1 shows an architectural diagram of a hyper-automation system according to some embodiments of the present invention.

FIG. 1 is an architectural diagram illustrating a hyper-automation system 10 according to some embodiments of the present invention. 'Hyper-automation' as used herein refers to automation systems that bring together components of robotic process automation, integration tools, and technologies that amplify the ability to automate work. In an exemplary robotic process automation scenario, an employee of a company uses a business application (e.g., word processor, spreadsheet editor, browser, email application) to perform a repetitive task, for instance to issue invoices to various clients. To carry out the respective task, the employee performs a sequence of operations/actions, which is herein deemed a work process. Exemplary operations forming a part of an invoice-issuing work process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of system 10 may collaborate to automate the respective work process by mimicking the set of operations performed by the respective human operator in the course of carrying out the respective task. Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface (GUI) may comprise having the operating system move the mouse pointer to the respective button and generating a mouse click event, or may alternatively comprise toggling the respective GUI button itself to a clicked state.

Exemplary processes targeted for RPA include processing of payments, invoicing, communicating with business clients (e.g., distribution of newsletters and/or product offerings), internal communication (e.g., memos, scheduling of meetings and/or tasks), auditing, and payroll processing, among others.

RPA may constitute the core of hyper-automation system 10, and in certain embodiments, automation capabilities may be expanded with artificial intelligence (AI)/machine learning (ML), process mining, analytics, and/or other advanced tools. As hyper-automation system 10 learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Exemplary hyper-automation system 10 includes RPA client computing systems 12a-c, such as a desktop computer, server computer, and smart phone, among others. Any desired client computing system may be used without deviating from the scope of the invention including, but not limited to, smart watches, laptop computers, tablet computers, Internet-of-Things (IoT) devices, etc. Also, while FIG. 1 shows only three client computing systems 12a-c, any suitable number of client computing systems may be used without deviating from the scope of the invention. For instance, in some embodiments, dozens, hundreds, thousands, or millions of RPA clients may be used. RPA clients 12a-c may be actively operated by a user or run automatically without much or any user input.

Each illustrated RPA client computing system 12a-c has respective automation module(s) 14a-c running thereon. Exemplary automation module(s) 14a-c may include, but are not limited to, RPA robots, parts of an operating system, downloadable application(s) for the respective computing system, any other suitable software and/or hardware, or any combination of these without deviating from the scope of the invention.

In some embodiments, one or more of module(s) 14a-c may be listeners. Listeners monitor and record data pertaining to user interactions with respective computing systems and/or operations of unattended computing systems and send the data to a hyper-automation core system 30 via a communication network 15 (e.g., a local area network-LAN, a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from such listener processes may be sent periodically as part of a heartbeat message, or in response to a fulfillment of a data accumulation condition. One or more RPA servers 32 receive and store data from the listeners in a database, such as RPA database(s) 34 in FIG. 1.

Other exemplary automation module(s) 14a-c may execute the logic that actually implements the automation of a selected process. Stated otherwise, at least one automation module 14a-c may comprise a part of an RPA robot as further described below. Robots may be attended (i.e., requiring human intervention) or unattended. In some embodiments, multiple modules 14a-c or computing systems may participate in executing the logic of an automation. Some automations may orchestrate multiple modules 14a-c, may carry out various background processes and/or may perform Application Programming Interface (API) calls. Some robotic activities may cause a module 14a-c to wait for a selected task to be completed (possibly by another entity or automation module) before resuming the current workflow.

In some embodiments, hyper-automation core system 30 may run a conductor application on one or more server computer systems, such as RPA server(s) 32. While FIG. 1 shows only one RPA server 32, multiple or many servers that are proximate to one another or in a distributed architecture may be employed without deviating from the scope of the invention. For instance, one or more of RPA server(s) 32 may be provided for conductor functionality, AI/ML model serving, authentication, governance, and or any other suitable functionality without deviating from the scope of the invention. In some embodiments, hyper-automation core system 30 may incorporate or be part of a public cloud architecture, a private cloud architecture, a hybrid cloud architecture, etc. In certain embodiments, hyper-automation core system 30 may host multiple software-based servers on one or more computing systems, such as RPA server(s) 32. In some embodiments, one or more servers of core hyper-automation system 30, such as RPA server(s) 32, may be implemented via one or more virtual machines (VMs).

In some embodiments, one or more of automation modules 14a-c may call one or more AI/ML models 36 deployed on or accessible by hyper-automation core 30. AI/ML models 36 may be trained for any suitable purpose without deviating from the scope of the invention. Two or more of AI/ML models 36 may be chained in some embodiments (e.g., in series, in parallel, or a combination thereof) such that they collectively provide collaborative output(s). Exemplary AI/ML models 36 may perform or assist with computer vision (CV), image processing, segmentation, and recognition, optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models 36 may be used without deviating from the scope of the invention. Using multiple AI/ML models 36 may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models 36 are deployed locally on at least one of RPA client computing systems 12a-c.

Hyper-automation system 10 may provide at least four main groups of functionality: (1) discovery; (2) building automations; (3) management; and (4) engagement. The discovery functionality may discover and provide automatic recommendations for different opportunities of automations of business processes. Such functionality may be implemented by one or more servers, such as RPA server 32. The discovery functionality may include providing an automation hub, process mining, task mining, and/or task capture in some embodiments.

The automation hub (e.g., UiPath Automation Hub™) may provide a mechanism for managing automation rollout with visibility and control. Automation ideas may be crowd-sourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from RPA clients 12a-c by listeners, for example, and processed by RPA server(s) 32. One or more AI/ML models 36 may be employed for this purpose. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 36 may be employed to uncover recurring task patterns in the data. Repetitive tasks that are ripe for automation may then be identified. This information may initially be provided by listener modules (e.g., automation modules 14a-c) and analyzed on servers of hyper-automation core 30. The findings from task mining process may be exported to process documents or to an RPA design application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to an RPA design application, such as UiPath Studio™. Task capture may simplify the requirements gathering process for both subject matter experts explaining a process and Center of Excellence (CoE) members providing production-grade automations.

The automation building functionality of hyper-automation system 10 may be accomplished via a computer program, illustrated as an RPA design application 40 in FIG. 1. Examples include UiPath Studio™, UiPath StudioX™, or UiPath Web™, among others. Such computer programs may be used to build and test automations for various applications and environments, such as web, mobile, SAP®, and virtualized desktops. In some embodiments, RPA design application 40 enables a human developer to design a workflow that effectively automates a target work process. A workflow typically comprises a sequence of custom automation steps, herein deemed RPA activities. Each activity includes at least one action performed by the robot, such as clicking a button, reading a file, writing to a spreadsheet cell, etc. Activities may be nested and/or embedded. In some embodiments, RPA design application 40 exposes a design interface and set of tools that give the developer control of the execution order and the relationship between activities of a workflow. In some embodiments, predefined activities, drag-and-drop modeling, and a workflow recorder may make automation easier with minimal coding. Document understanding functionality may be provided by AI activities for data extraction and interpretation that call one or more AI/ML models 36. Such automations may process virtually any document type and format, including tables, webpages, forms, signatures, and handwriting.

RPA design application 40 may also be used to seamlessly combine user interface (UI) automation with API automation, for example to provide API integration with various other applications, technologies, and platforms. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 10 may provide user interfaces, development environments, API integration, pre-built and/or custom-built AI/ML models, development templates, integrated development environments (IDEs), and advanced AI capabilities. Hyper-automation system 10 may further enable deployment, management, configuration, monitoring, debugging, and maintenance of RPA robots for carrying out the automations designed using application 40.

The management functionality of hyper-automation system 10 may provide deployment, orchestration, test management, AI functionality, and optimization of automations across an organization. Other exemplary aspects of management functionality include DevOps activities such as continuous integration and continuous deployment of automations. Management functionality may also act as an integration point with third-party solutions and applications for automation applications and/or RPA robots.

As an example of management functionality, a conductor application or service may facilitate provisioning, deployment, configuration, queuing, monitoring, logging, and interconnectivity of RPA robots, among others. Examples of such conductor applications/services include UiPath Orchestrator™ (which may be provided as part of the UiPath Automation Cloud™ or on premises, inside a virtual machine, or as a cloud-native single container suite via UiPath Automation Suite™). A test suite of applications/services (e.g., UiPath Test Suite™) may further provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

AI management functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models 36 from the AI center. Performance of the AI/ML models may be monitored. Models 36 may be trained and improved using human-validated data, such as that provided by a data review center as illustrated in FIG. 1. Human reviewers may provide labeled data (e.g., a training corpus) to hyper-automation core 30 via a review application 38 executing on a computer connected to network 15. Reviewers may also use application 38 to validate that predictions by AI/ML models 36 are accurate, and provide corrections otherwise. This dynamic input may then be saved as training data for retraining AI/ML models 36, and may be stored in a database such as RPA database 34, for example. The AI center may schedule and execute training jobs to train the new versions of AI/ML models 36 using the training data.

The engagement functionality of hyper-automation system 10 engages humans and automations as one team for seamless collaboration on desired processes. Low-code applications may be built (e.g., via UiPath Apps™) to connect to browser and legacy software. Applications may be created quickly using a web browser through a rich library of drag-and-drop controls, for instance. An application can be connected to a single automation or multiple automations. An action center (e.g., UiPath Action Center™) may provide a mechanism to hand off processes from robots to humans, and vice versa. Humans may provide approvals or escalations, make exceptions, etc. RPA robots may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations/workflows approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

In another exemplary engagement functionality, Chatbots (e.g., UiPath Chatbots™), social messaging applications, and/or voice commands may enable users to run automations. This may simplify access to information, tools, and resources users need to interact with customers or perform other activities. For instance, a chatbot may respond to a command formulated in a natural language by triggering a robot configured to perform operations such as checking an order status, posting data in a CRM, etc.

In some embodiments, some functionality of hyper-automation system 10 may be provided iteratively and/or recursively. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
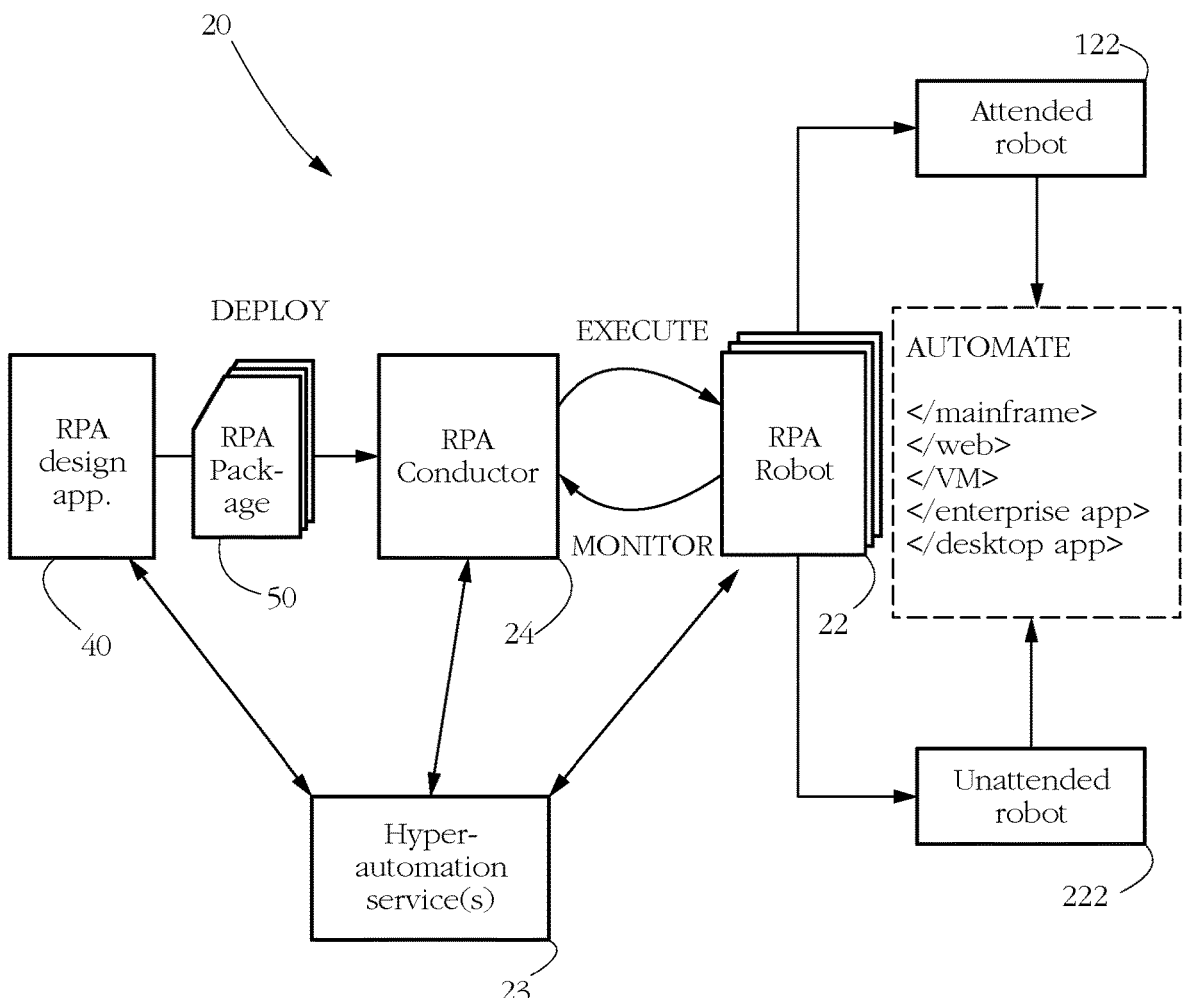
FIG. 2 illustrates an exemplary RPA system according to some embodiments of the present invention.

FIG. 2 illustrates exemplary components and operation of an RPA system 20 according to some embodiments of the present invention. RPA system 20 may form a part of hyper-automation system 10 of FIG. 1. RPA system 20 includes an RPA design application 40 that enables a developer to build automations, i.e., design and implement RPA workflows. For instance, application 40 may expose a user interface and set of tools that give the developer control of the execution order and the relationship between activities of a workflow. One commercial example of RPA design application 40 is UiPath Studio™.

Some types of RPA workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed, it may be encoded in computer-readable form, such as an RPA script or an RPA package 50 (FIG. 2). An RPA script comprises a specification of the respective workflow, the specification comprehensible to (or interpretable by) RPA robot 22. RPA scripts may be formulated according to any data specification format known in the art, for instance in a version of an extensible markup language (XML), Javascript Object Notation (JSON), or a programming language such as C#, Visual Basic, Java, etc. Alternatively, RPA scripts may be formulated in an RPA-specific version of bytecode, or even as a sequence of instructions formulated in a natural language such as English, Spanish, Japanese, etc. In some embodiments, one or more related RPA scripts are bundled together with other files and/or metadata, to form RPA package 50. For instance, beside RPA scripts, RPA package 50 may comprise a specification of a resource required for executing the respective workflow(s). Exemplary resources include a location of a file (e.g., path, URL), a filename, and a set of credentials for accessing a particular machine, computer program, or service, among others. In what is commonly known in the art as a 'build', RPA scripts may be pre-compiled into a set of executable files which may include a main executable and accompanying libraries, resource specifications and metadata, to form RPA package 50. Package 50 may use any data specification format known in the art. For instance, some embodiments of package 50 comprise a NuGet package of .NET assembly files.

A skilled artisan will appreciate that RPA design application 40 may comprise multiple components/modules, which may execute on distinct physical machines. In one such example illustrating a cloud computing embodiment of the present invention, RPA design application 40 may execute in a client-server configuration, wherein one component of application 40 may expose an automation design interface on the developer's computer, and another component of application 40 executing on a remote server may assemble the workflow and formulate/output RPA package 50. For instance, a developer may access the automation design interface via a web browser executing on the developer's computer, while the software processing the user input received at the developer's computer actually executes on the server.

In some embodiments, a workflow designed in RPA design application 40 is deployed to an RPA conductor 24, for instance in the form of an RPA package as described above. Per the above, in some embodiments, conductor 24 may be part of hyper-automation core system 30 illustrated in FIG. 1. One commercial example of conductor 24 is UiPath Orchestrator™.

Conductor 24 orchestrates one or more RPA robots 22 that execute the respective workflow. Such 'orchestration' may include creating, monitoring, and deploying computing resources for robots 22 in an environment such as a cloud computing system and/or a local computer. Orchestration may further comprise, among others, deployment, configuration, queueing, monitoring, logging of robots 22, and/or providing interconnectivity for robots 22. Provisioning may include creating and maintaining connections between robots 22 and conductor 24. Deployment may include ensuring the correct delivery of software (e.g, RPA packages 50, individual workflow specifications) to robots 22 for execution. Configuration may include maintenance and delivery of robot environments and workflow configurations. Queueing may include providing management of job queues and queue items. Monitoring may include keeping track of robot state and maintaining user permissions. Logging may include storing and indexing logs to a database and/or another storage mechanism (e.g., SQL, ElasticSearch®, Redis®). Conductor 24 may further act as a centralized point of communication for third-party solutions and/or applications. In some embodiments as further described below, conductor 24 may further provide automation troubleshooting services and assistance.

RPA robots 22 are execution agents (e.g., computer programs) that implement automation workflows targeting various systems and applications including, but not limited to, mainframes, web applications, virtual machines, enterprise applications (e.g., those produced by SAP®, SalesForce®, Oracle®, etc.), desktop and laptop applications, mobile device applications, wearable computer applications, etc. One commercial example of robot 22 is UiPath Robots™.

In some embodiments, to mimic a human user's interaction with a user interface of a target application, RPA robot 22 interfaces with a set of RPA drivers 25 executing on the respective RPA client/host computer. Such drivers generically represent software modules that carry low-level operations such as moving a cursor on screen, registering and/or executing mouse, keyboard, and/or touchscreen events, detecting a current posture/orientation of a handheld device, detecting a current accelerometer reading, taking a photograph with a smartphone camera, grabbing a screenshot of the respective device, etc. Some such drivers form a part of the local operating system. Other RPA drivers 25 may implement various application-specific aspects of a user's interaction with complex target applications such as SAP®, Citrix® virtualization software, Microsoft Excel®, etc. One particular example comprises a browser driver, which may be embodied as a set of browser-compatible scripts (e.g. JavaScript®). When injected into a web page currently displayed within the browser, such a browser driver may identify various elements of the respective web page (e.g., buttons, menus, form fields, etc.), and may invoke a specific functionality of a respective element (e.g., type into a form field, select a menu item, toggle a checkbox, etc.). Other exemplary RPA drivers 25 include the Microsoft® WinApp-Driver, XCTest drivers from Apple, Inc., and UI Automator drivers from Google, Inc.

Types of robots may include attended robots 122, unattended robots 222, development robots (similar to unattended robots, but used for development and testing purposes), and nonproduction robots (similar to attended robots, but used for development and testing purposes), among others. Some activities of attended robots 122 are triggered by user events and/or commands and operate alongside a human operator on the same computing system. In some embodiments, attended robots 122 can only be started from a robot tray or from a command prompt and thus cannot be entirely controlled by conductor 24 and cannot run under a locked screen, for example. Unattended robots may run unattended in remote virtual environments and may be responsible for remote execution, monitoring, scheduling, and providing support for work queues.

In some embodiments executing in a Windows® environment, robot 22 installs a Microsoft Windows® Service Control Manager (SCM)-managed service by default. As a result, such robots can open interactive Windows® sessions under the local system account and have the processor privilege of a Windows® service. For instance, a console application may be launched by a SCM-managed robot. In some embodiments, robot 22 may be installed at a user level of processor privilege (user mode, ring 3). Such a robot has the same rights as the user under which the respective robot has been installed. For instance, such a robot may launch any application that the respective user can. On computing systems that support multiple interactive sessions running simultaneously (e.g., Windows® Server 2012), multiple robots may be running at the same time, each in a separate Windows® session, using different usernames.

In some embodiments, robots 22 are split into several components, each being dedicated to a particular automation task. The robot components in some embodiments include, but are not limited to, SCM-managed robot services, user-mode robot services, executors, agents, and command-line. Depending on platform details, SCM-managed and/or user-mode robot services manage and monitor Windows® sessions and act as a proxy between conductor 24 and the host machines (i.e., the computing systems on which robots 22 execute). These services are trusted with and manage the credentials for robots 22. The command line is a client of the service(s), a console application that can be used to launch jobs and display or otherwise process their output.

Figure 3:
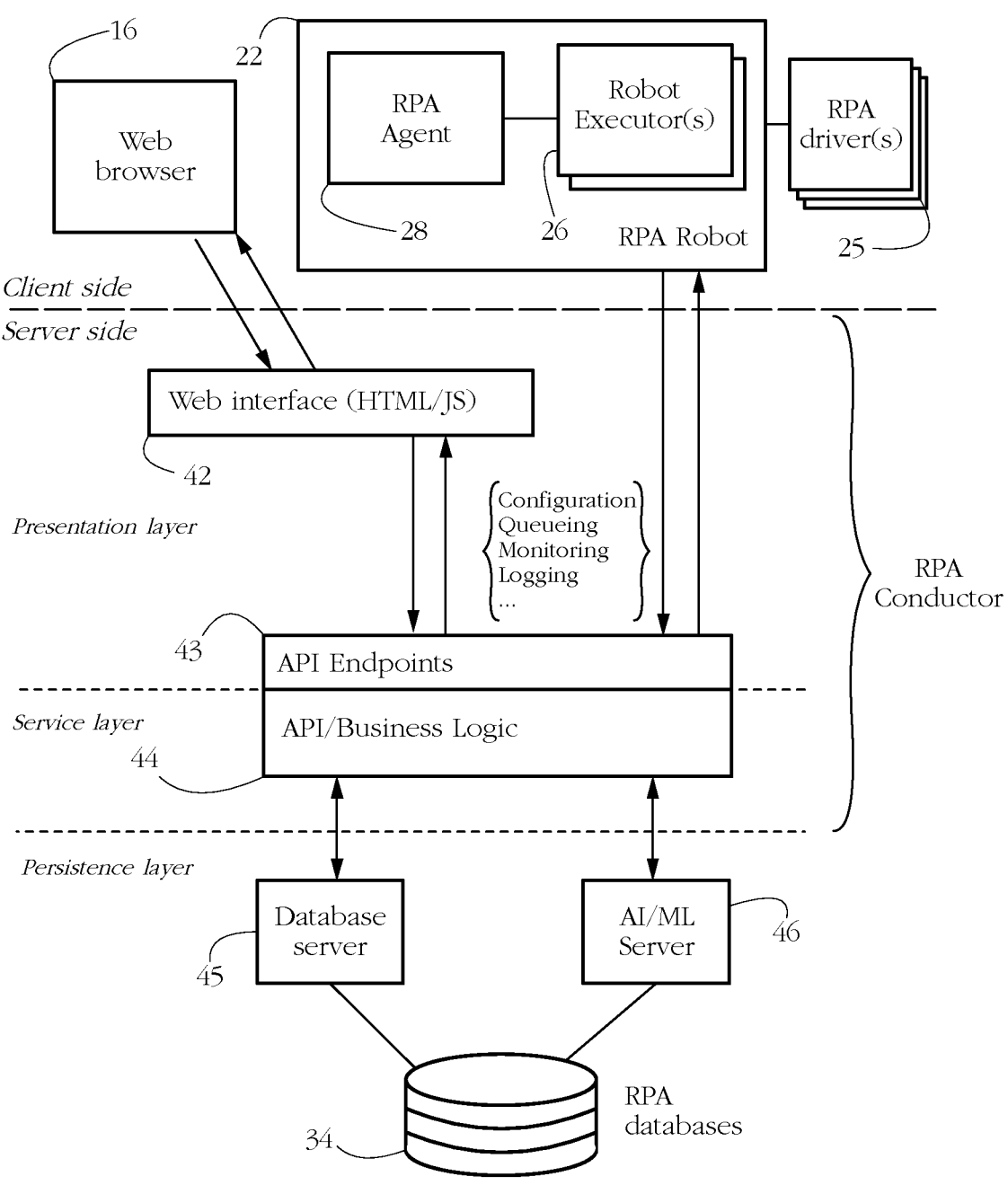
FIG. 3 shows an exemplary deployed RPA system executing in a client-server configuration according to some embodiments of the present invention.

An exemplary set of robot executors 26 and an RPA agent 28 are illustrated in FIG. 3. Robot executors 26 may run given jobs under a Windows® session. Executors 26 are configured to receive RPA package 50 specifying a workflow (e.g., sequence of robotic activities), and to execute the respective package which effectively amounts to carrying out the respective sequence of RPA activities. In some embodiments, package 50 comprises pre-compiled executable code. In other exemplary embodiments, robot executor(s) 26 comprise an interpreter (e.g., a just-in-time interpreter or compiler) configured to translate a received RPA script comprising a workflow specification (e.g., bytecode, XML, JSON etc.) into runtime code comprising processor instructions for carrying out the respective workflow. Executing RPA package 50 may thus comprise executor(s) 26 translating a workflow specification included in package 50 and instructing a processor of the respective host machine to load the resulting runtime code into memory and to launch the runtime code into execution.

RPA agent 28 may manage the operation of robot executor(s) 26. For instance, RPA agent 28 may select tasks/scripts for execution by robot executor(s) 26 according to an input from a human operator and/or according to a schedule. Agent 28 may start and stop jobs and configure various operational parameters of executor(s) 22. When robot 22 includes multiple executors 26, agent 28 may coordinate their activities and/or inter-process communication. RPA agent 28 may further manage communication between RPA robot 22 and conductor 24 and/or other entities.

Exemplary RPA system 20 in FIG. 2 forms a part of hyper-automation system 10 (see FIG. 1). As such, robots 22 may interact with various components and use various aspects of hyper-automation core system 30, illustrated generically as hyper-automation services 23 in FIG. 2. For instance, developers may use RPA design application 40 to build and test RPA robots 22 that utilize AI/ML models 36. Such RPA robots 22 may send input for execution of the AI/ML model(s) and receive output therefrom via hyper-automation core system 30. Robot 22 may be a listener, as described above. These listeners may provide information to core hyper-automation system 30 regarding what users are doing when they use their computing systems. This information may then be used by hyper-automation system 30 for process mining, task mining, task capture, etc. In another exemplary embodiment, hyper-automation services 23 may expose data labeling functionality to user of the computing system hosting robot 22 or to another computing system that robot 22 provides information to. For instance, if robot 22 calls a computer vision AI/ML model 36 but the respective model does not correctly identify a button on the screen, the user may explicitly provide a correct identification. Such information may be passed on to hyper-automation core system 30 and then used for re-training the respective AI/ML model.

In some embodiments, selected components of hyper-automation system 10 and/or RPA system 20 may execute in a client-server configuration. In one such configuration illustrated in FIG. 3, RPA robot 20 including executor(s) 26 and RPA agent 28 may execute on a client side, for instance on one of RPA client computers 12a-c in FIG. 1. In turn, the functionality of conductor 24 and/or other services of hyper-automation core system 30 may be implemented on the server side, e.g., on remote RPA servers 32 (FIG. 1). It should be noted that the client side, the server side, or both, may include any desired number of computing systems (e.g., physical or virtual machines) without deviating from the scope of the invention. The illustrated RPA system may be cloud-based, on-premises, or a combination thereof, offering enterprise-level, user-level, or device-level automation solutions for automation of different work processes.

Robot 22 may run several jobs/workflows concurrently. RPA agent 28 (e.g., a Windows® service) may act as a single client-side point of contact of multiple executors 26. Agent 28 may further manage communication between robot 22 and conductor 24. In some embodiments, communication is initiated by RPA agent 28, which may open a WebSocket channel to conductor 24. Agent 28 may subsequently use the channel to transmit notifications regarding the state of each executor 26 to conductor 24, for instance as a heartbeat signal. In turn, conductor 24 may use the channel to transmit acknowledgements, job requests, and other data such as RPA packages 50 to robot 22.

In one embodiment as illustrated in FIG. 3, conductor 24 includes a web interface 42 and a set of service modules comprising a set of Application Programming Interface (API) endpoints 43 and service APIs/business logic 44. A user may interact with conductor 24 via web interface 42 (e.g., by opening a dedicated web page on a browser 16), to instruct conductor 24 to carry out actions such as scheduling and/or starting jobs on robot 22, creating robot groups/pools, assigning workflows to robots, adding/removing data to/from queues, analyzing logs per robot or workflow, etc. Interface 42 may be implemented using Hypertext Markup Language (HTML), JavaScript (JS), or any other data format known in the art.

Conductor 24 may carry out actions requested by the user by selectively calling service APIs/business logic 44 via endpoints 43. In addition, some embodiments use API endpoints 43 to communicate between RPA robot 22 and conductor 24, for tasks such as configuration, logging, deployment, monitoring, and queueing, among others. API endpoints 43 may be set up using any data format and/or communication protocol known in the art. For instance, API endpoints 43 may be Representational State Transfer (REST) and/or Open Data Protocol (OData) compliant.

Configuration endpoints may be used to define and configure application users, permissions, robots, assets, releases, etc. Logging endpoints may be used to log different information, such as errors, explicit messages sent by robot 22, and other environment-specific information. Deployment endpoints may be used by robot 22 to query the version of RPA package 50 to be executed. Queueing endpoints may be responsible for queues and queue item management, such as adding data to a queue, obtaining a transaction from the queue, setting the status of a transaction, etc. Monitoring endpoints may monitor the execution of web interface 42 and/or RPA agent 28.

Service APIs 44 comprise computer programs accessed/called through configuration of an appropriate API access path, e.g., based on whether conductor 24 and an overall hyper-automation system have an on-premises deployment type or a cloud-based deployment type. Exemplary APIs 44 provide custom methods for querying stats about various entities registered with conductor 24. Each logical resource may be an OData entity in some embodiments. In such an entity, components such as a robot, process, queue, etc., may have properties, relationships, and operations. APIs 44 may be consumed by web application 42 and/or RPA agent 28 by getting the appropriate API access information from conductor 24, or by registering an external application to use the OAuth flow mechanism.

In some embodiments, a persistence layer of server-side operations implements a database service. A database server 45 may be configured to selectively store and/or retrieve data to/from RPA databases 34. Database server 45 and database 34 may employ any data storage protocol and format known in the art, such as structured query language (SQL), ElasticSearch®, and Redis®, among others. Exemplary data stored/retrieved by server 45 may include configuration parameters of robots 22 and robot pools, as well as data characterizing workflows executed by robots 22, data characterizing users, roles, schedules, queues, etc. In some embodiments, such information is managed via web interface 42. Another exemplary category of data stored and/or retrieved by database server 45 includes data characterizing the current state of each executing robot, as well as messages logged by robots during execution. Such data may be transmitted by robots 22 via API endpoints 43 and centrally managed by conductor 24, for instance via API logic 44.

Server 45 and database 34 also store/manage process mining, task mining, and/or task capture-related data, for instance received from listener modules executing on the client side as described above. In one such example, listeners may record user actions performed on their local hosts (e.g., clicks, typed characters, locations, applications, active elements, times, etc.) and then convert these into a suitable format to be provided to and stored in database 34.

In some embodiments, a dedicated AI/ML server 46 facilitates incorporation of AI/ML models 36 into automations. Pre-built AI/ML models, model templates, and various deployment options may make such functionality accessible even to operators who lack advanced or specialized AI/ML knowledge. Deployed robots 22 may call AI/ML models 36 by interfacing with AI/ML server 46. Performance of the deployed AI/ML models 36 may be monitored and the respective models may be re-trained and improved using human-validated data. AI/ML server 46 may schedule and execute training jobs and manage training corpora. AI/ML server 46 may further manage data pertaining to AI/ML models 36, document understanding technologies and frameworks, algorithms and software packages for various AI/ML capabilities including, but not limited to, intent analysis, natural language processing (NLP), speech analysis and synthesis, computer vision (image processing, segmentation, and recognition) etc.

Figure 4:
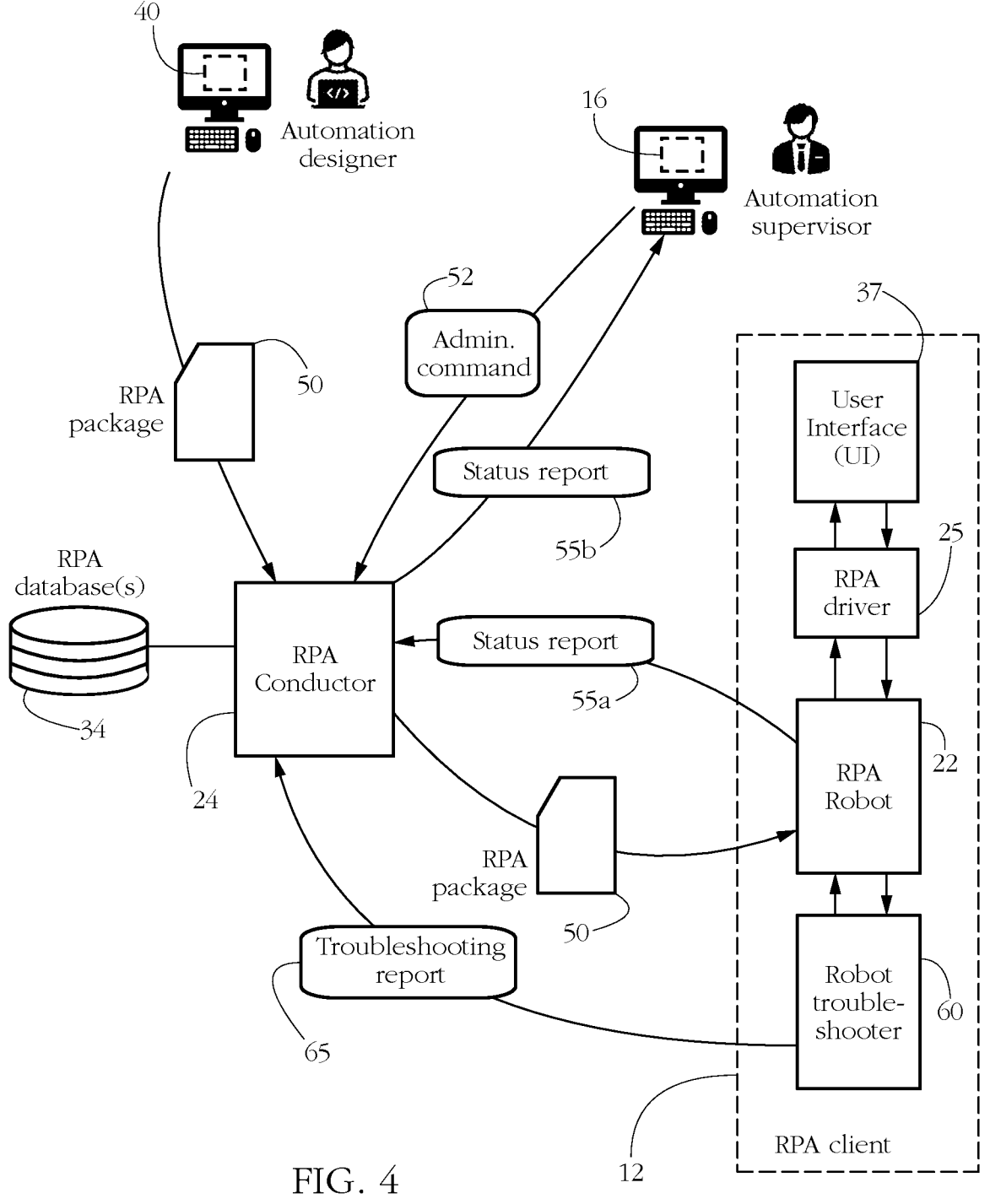
FIG. 4 illustrates an exemplary data exchange according to some embodiments of the present invention.

FIG. 4 shows an exemplary automation troubleshooting system according to some embodiments of the present invention. In an exemplary use-case scenario involving automating an airport check-in procedure, an RPA robot 22 is configured to receive a scan of a passenger's passport and automatically extract structured data from it, such as a name, nationality, and passport number. The RPA robot may then automatically enter passenger data into a web-based airport check-in form. To carry out the form-filling activities, robot 22 may identify each field of the respective form and fill in the appropriate information. In another exemplary use-case scenario, RPA robot 22 may be tasked with extracting client data from selected fields of a spreadsheet and formulating an invoice for delivery to the respective clients. To carry out the respective tasks, robot 22 may identify the respective spreadsheet target cells, read their contents, etc.

RPA robot 22 executes on an exemplary RPA client 12, which generically represent any of RPA clients 12*a-c* in FIG. 1. In the check-in automation example above, RPA client 12 may comprise a desktop computer located at the respective airport terminal, or a cloud computing platform operated by the respective airline. In the automated invoicing example, RPA robot 22 may execute for instance on a desktop computer of a corporate accounting department. In either case, robot 22 interacts with a user interface 37 (e.g., a web browser interface, an interface of a spreadsheet application, etc.), the respective interaction facilitated by local instances of RPA driver(s) 25.

In a typical RPA setup, the workflow implementing the respective automation is developed by an automation designer using an instance of RPA design application 40 and encoded in computer-readable form as RPA package 50. Package 50 is then transmitted to the robot instance tasked with executing the respective automation. FIG. 4 illustrates a complex setup wherein management of robots and automations is carried out by RPA conductor 24 as described in detail above. An automation supervisor may configure and follow the execution of the respective automation via a conductor web interface (see description above related to FIG. 3). In exemplary embodiments, the automation supervisor issues administration commands 52 (e.g., API calls via HTTP requests) to RPA conductor 24, for instance to assign workflows to robot instances, schedule, start, stop, and inspect the current state of various automations, etc. Executing robots may communicate their current status and/or various events to conductor 24 via status reports 55*a* (e.g. heartbeat signals). In turn, conductor 24 may inform the automation supervisor on the current status of various automations via status reports 55*b*, which may further include troubleshooting reports as shown in detail below.

A skilled artisan will understand that a full-fledged RPA system as illustrated in FIG. 4 may be simplified without altering the scope of the present invention. For instance, in alternative embodiments that do not involve conductor 24, robot 22 may execute locally, on the same physical machine that is used to design the RPA workflow (package 50). In yet another exemplary embodiment, robot 22 executes on a remote host, but the automation designer uses the same physical machine to both design and supervise the execution of the respective workflow.

In some embodiments, a robot troubleshooting module 60 is communicatively coupled to RPA robot 22 and configured to perform automation troubleshooting activities as described in detail below. Troubleshooting herein denotes automatically determining a cause of failure of a selected automation and informing a user about the respective cause. In some embodiments, module 60 is further configured to automatically detect the respective failure. Alternatively, module 60 may respond to an explicit troubleshooting request received from robot 22, RPA conductor 24, and/or other machine or software entity. In some embodiments as illustrated, troubleshooter 60 executes on the same host/RPA client computer as robot 22. Module 60 may interact closely with, or may even form a part of RPA driver(s) 25.

Figure 11:
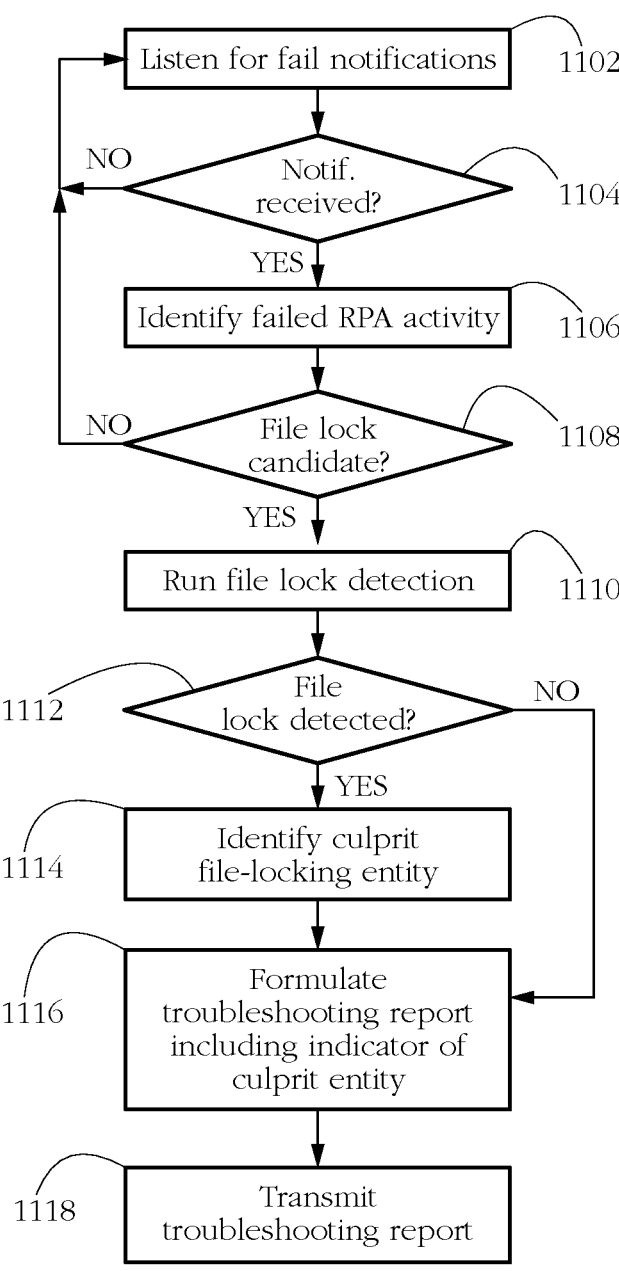
FIG. 11 shows an exemplary sequence of steps performed by the troubleshooting module to detect file locking according to some embodiments of the present invention.

In the embodiment illustrated in FIG. 4, troubleshooter 60 collaborates with RPA conductor 24 to communicate a cause of failure to the automation supervisor. Module 60 may transmit a troubleshooting report 65 to conductor 24, and conductor 24 may further incorporate troubleshooting data into status report 55*b*. For instance, web interface 42 of RPA conductor 24 may include a dedicated area displaying robot/automation troubleshooting information. In alternative embodiments that do not use multi-robot orchestration, module 60 may communicate troubleshooting information directly to a user of the respective RPA host, for instance via a pop-up/dialog window displayed on a screen of client 12. Some examples of troubleshooting messages are shown in FIGS. 9 and 11.

Embodiments Detecting UI Focus Stealing

Figure 5:
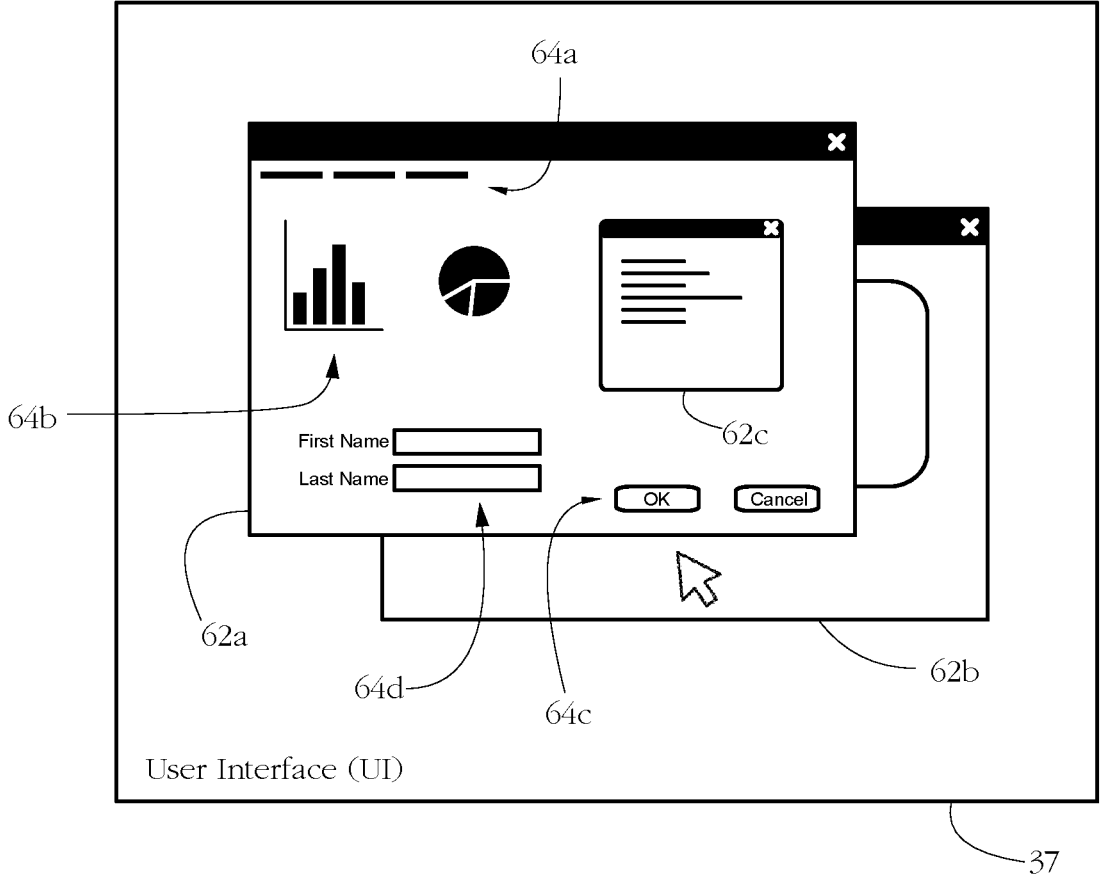
FIG. 5 shows an exemplary user interface (UI) according to some embodiments of the present invention.

FIG. 5 illustrates an exemplary user interface 37 according to some embodiments of the present invention. In general, a user interface is a computer interface that enables human-machine interaction, e.g., an interface configured to receive user input, respond to the respective input, and communicate results of a computation back to the user. A common example of user interface is known as a graphical user interface (GUI), which enables human-machine interaction via a set of graphical UI elements displayed to the user. Exemplary UI elements illustrated in FIG. 5 include a window 62*a-c*, a menu 64*a*, an icon 64*b*, a button 64*c*, and an input field 64*d*. Other exemplary UI elements comprise, among others, a label, a text area, a form having multiple input fields, a toggle, and a hyperlink. UI elements may display information, receive input (text, mouse events), and/or control a functionality of software and/or the respective computing device.

A window (e.g., windows 62*a-c* in FIG. 5) is a particular type of UI element, herein defined as a distinct visual area of a GUI, delimited by a border and grouping together multiple UI elements that are functionally related. Examples of windows include a main application window, a pop-up window, a dialog/message box, a browser window, a browser tab, a browser frame, and a web page overlay, among others.

Some types of user interfaces are vulnerable to focus stealing. A UI element (e.g., window 62*a*) is herein deemed to have focus as long as it is selected to receive input. During normal use, focus can move from one UI element to another in response to various user actions such as keystrokes (e.g., TAB key) and mouse events, among others. For instance, in some operating systems, a window may be brought into focus by clicking/tapping anywhere inside it. Alternatively, focus may follow the mouse pointer or cursor, i.e., the window currently enclosing the pointer has the focus. In yet another example, as the user progressively fills out a form, focus moves from one form field to another.

However, focus can also shift in response to events other than user interactions with the respective interface. Such situations are known in the art as focus stealing. Examples include the unexpected display of a pop-up window or dialog by the application the user is currently interacting with or by other software including the local operating system. Such pop-up windows typically communicate error messages, warnings, reminders, calendar notifications, notifications of incoming communications (e.g., new mail, incoming Zoom® call), social media notifications, and notifications of software updates, among others. In response to such notifications, focus may inadvertently move to the respective pop-up window or dialog, especially if the respective notification requests an input or acknowledgement from the user.

One example of focus stealing is illustrated in FIG. 6, wherein an RPA target window 62*d* comprises a GUI of a spreadsheet application such as Microsoft Excel®, and a focus-stealing window 62*e* comprises a pop-up dialog notifying the user of an available software update. In another example illustrated in FIG. 7, a target window 62*f* comprises a web browser window displaying a target web page, and a focus-stealing window 62*g* comprises a page overlay inviting the user to agree to a cookie policy. Other common examples of overlays that may steal focus from an underlying page include advertisements, discount offers/deals, login interfaces, gamified overlays aimed at increasing visitor engagement, and shopping cart-related notifications, among others.

Focus theft may cause an RPA automation to fail. One reason for failure is that the OS typically directs keyboard input to the window currently in focus. Therefore, in a situation as illustrated in FIG. 6, if the focus shifts from window 62*d* to focus-stealing window 62*e* while the robot is attempting to write to a cell of the respective spreadsheet, the respective write will fail because the keyboard input will not be directed to the target spreadsheet cell. Another way automations may fail is by failing to identify a target of an RPA activity (e.g., a button to click), because the robot will typically look for the target within the window currently in focus. In the FIG. 7 example wherein the automation comprises filling out an online form, the robot may no longer find the expected form because focus has shifted from the main browser window 62*f* to overlay 62*g*.

In some applications, a pop-up window may cause a running automation to fail even if it does not explicitly steal focus from a target of the respective automation, for instance by accidentally obscuring the respective target so the robot may no longer find it or act on it. Such a pop-up window that obscures a target window or other target UI element of an automation without stealing focus is herein deemed a rogue window. Typical rogue windows display notifications that do not request input from the user, for instance notifications of calendar events, notifications of incoming communications (incoming email), and social media notifications, among others. In some operating systems implementing a click-to-focus UI paradigm, a rogue window may eventually steal focus from the target window following actions of RPA robot 22. In one such example, an attempt to click on a button that is currently covered by a rogue window may cause focus to switch to the rogue window. Some embodiments may therefore detect rogue windows using focus theft detection procedures as described below.

Figure 8:
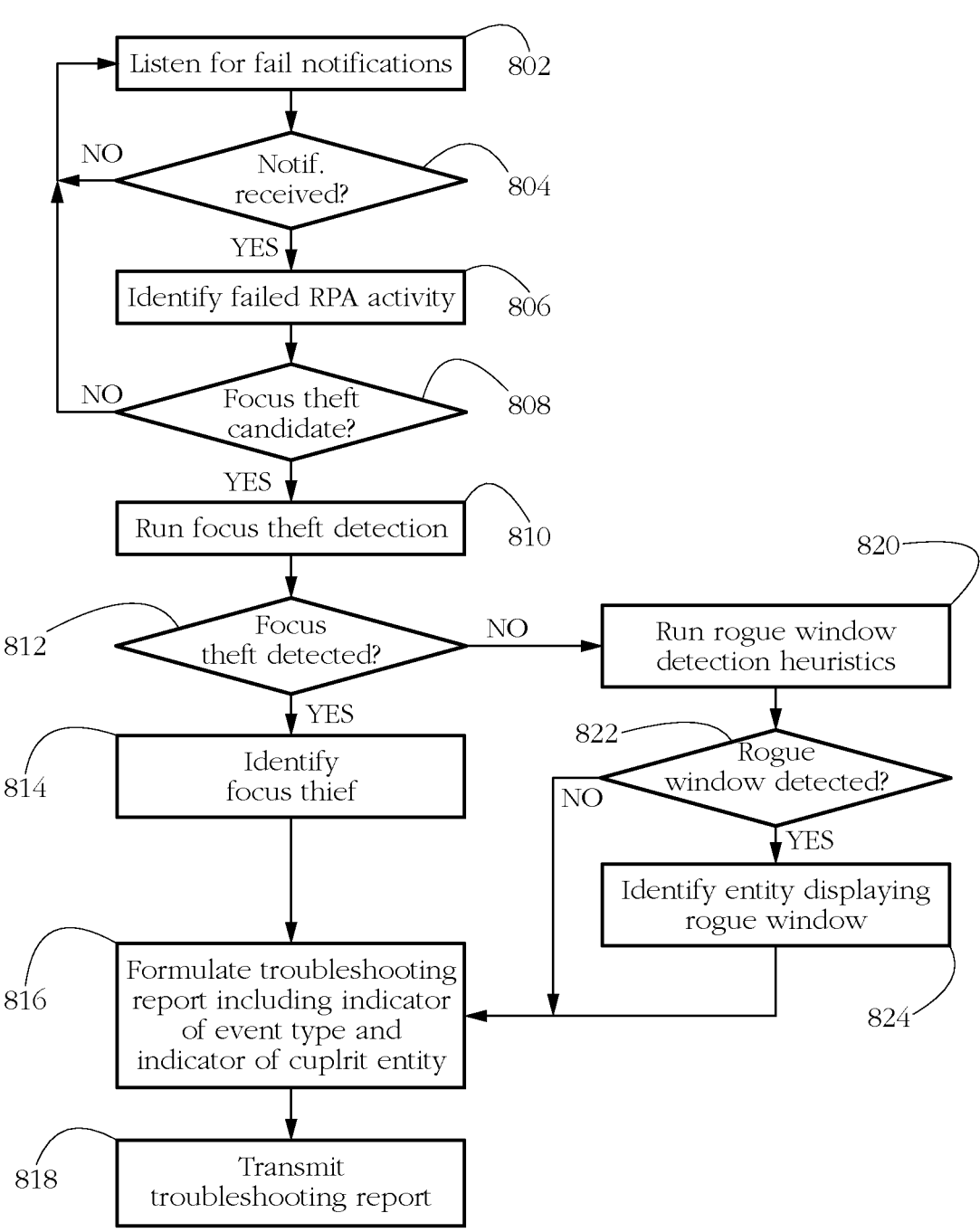
FIG. 8 shows an exemplary sequence of steps performed by a troubleshooting module to detect focus stealing according to some embodiments of the present invention.

In some embodiments, troubleshooter 60 is configured to detect focus theft and inform the user on the cause of an automation failure. FIG. 8 shows an exemplary sequence of steps performed by troubleshooter module 60 according to some embodiments of the present invention. In a sequence of steps 802-804 troubleshooter 60 may wait for a notification of failure. In some embodiments, robot 22 may notify module 60 about a failure to execute a current automation. Alternatively, module 60 may detect a failure by inspecting a current state of RPA robot 22. In yet another exemplary embodiment, module 60 may receive a notification of failure from RPA conductor 24 which is typically aware of the state of each robot in its supervision. When an automation failure is detected (step 804) returns a YES, a step 806 may identify an RPA activity which failed to execute. Again, step 806 may comprise collaborating with RPA robot 22 or inspecting a current state of robot 22. In some embodiments, a step 808 performs a preliminary filtering to determine whether the current failure could have been caused by focus theft. Step 808 may apply a set of heuristics according to a type of RPA activity (e.g., UI activities may be affected by focus stealing events while file manipulation activities may not), a type of activity target, a type of target application, a current date and/or time, etc.

If step 808 returns a YES, in a step 810 some embodiments will execute a set of focus theft detection procedures. Multiple procedures may be applied in sequence, for instance as part of a decision tree. Alternatively, several procedures may be applied independently of each other, and their results may be combined for instance using a weighted scoring system.

Focus theft detection procedures may vary according to hardware and software details of RPA client 12, e.g., according to a type and version of an operating system. Typical procedures may include identifying the window currently in focus and comparing it with the intended target window of the current RPA activity (as indicated for instance in RPA package 50). A mismatch may indicate focus theft. Using the example in FIG. 6, by determining that the window currently in focus differs from the one displaying the target spreadsheet, module 60 may conclude that the cause of failure includes focus theft. The identity of the window currently in focus may be determined by examining specific data structures that the OS uses to manage the content of the display. For instance, in some versions of the Windows® operating system, the function Get ForegroundWindow returns a handle to the window that currently has the focus. Knowledge of the respective handle further enables determining other characteristics of the window currently in focus, such as a window name or title, handles to the contents of the respective window, etc. The window handle may further allow identifying which process and/or application uses the respective window. In an exemplary procedure, module 60 may enumerate all currently running processes and inspect their respective window handles, if any, and attempt to match them with the discovered handle of the window currently in focus. Some embodiments may further determine various characteristics of the process using the window currently in focus, such as a maker/developer of the respective software, a location of an executable file, a username of the owner of the respective process, etc. Such characteristics may then be used to determine whether the process using the window currently in focus matches a target application of the current automation (e.g. Microsoft Excel®, Chrome® browser, etc.).

More sophisticated focus theft detection procedures may include module 60 keeping an event log recording a time trace of all focus change events occurring on the respective RPA client during a time interval that includes or coincides with the execution of a specific automation. The event log may include various metadata such as an identifier of the process owning focus after each focus shift, a location of an executable file of the respective process, a timestamp of each focus shift, etc. Details of setting up an event logging service may be platform-specific. Exemplary embodiments may employ event logging facilities included in the respective OS, such as Event Tracing for Windows® (ETW), among others. Relevant process metadata may be extracted from various data structures managed by the OS, as described above. In embodiments that employ event logging, step 810 may include parsing the event log in response to detecting the automation failure and determining whether a focus stealing event may have caused the failure according to a time of occurrence of the respective failure. Such embodiments may successfully diagnose the cause of a failing automation in cases where the focus stealing event that caused the failure was followed by other focus changes so that the identity of the focus thief may not be determined simply by identifying the window current in focus.

In an exemplary situation as illustrated in FIG. 7, wherein an overlay steals focus from a main browser window, some embodiments may detect focus theft by analyzing browser data structures that describe and/or control the rendering of content within the browser window(s), e.g., a document object model (DOM) of a currently loaded document. In some embodiments, RPA robot 22 uses a browser driver (part of RPA drivers 25) to read and manipulate the DOM, for instance via JavaScript® commands. The respective driver is typically injected into the document/web page making the object of the current automation. In such embodiments, troubleshooter 60 may collaborate with driver 25 to inspect the DOM, for instance to determine which element of the browser interface is currently in focus, and to compare the result with an identity of the intended target of the failed RPA activity. A mismatch may indicate focus theft.

In yet other, more sophisticated exemplary embodiments, step 810 may include employing image processing/computer vision systems and methods to determine whether UI focus theft has caused the automation failure. FIG. 9 details step 810 in an embodiment using image processing to detect focus theft. A step 902 may use any of the methods described above (e.g., focus log, DOM inspection, etc.) to determine information indicative of a focus steal. In a further sequence of steps 904-906, troubleshooter 60 may grab a screenshot of at least a part of a display of RPA client 12 and transmit the respective image to an image-processing AI module, which may execute locally or remotely. In preferred embodiments, the respective AI module may form a part of AI models 36 described above in relation to FIGS. 1-2. The respective AI module may comprise a set of pre-trained artificial neural networks. The architectural and functional details of such image processing modules are beyond the scope of the present description. Training may use any appropriate machine learning procedure known in the art and an extensive and diverse corpus of sample images collected from RPA clients.

In some embodiments, the image-processing AI module may return an indicator of whether the received screenshot is indicative of focus stealing. In alternative embodiments, selected AI models 36 may be pre-trained to classify and/or otherwise interpret the content of the received screenshot, for instance to detect all UI windows present within a received image. Such an AI model may then output a set of window descriptors, each descriptor characterizing a distinct window shown in the received screenshot. An exemplary window descriptor may include a set of corner coordinates and a title/name of a respective window, among others. Other AI models 36 may further detect, locate, and characterize a set of actionable UI elements (e.g., buttons for clicking/tapping) included in each detected window. A step 910 may then corroborate data received from AI-driven image processing module(s) with other focus-theft-indicative data extracted in step 902 to determine whether focus stealing has caused the current automation failure. In some embodiments, step 910 may include passing a window descriptor received from AI models 36 further onto local RPA driver(s) 25, which may further extract information about the respective window directly from target UI 37 and apply a set of heuristics to determine whether the respective window is currently in focus.

When a determination was made that focus stealing was indeed the cause of failure (a step 812 in FIG. 8 returns a YES), in a further step 814 troubleshooter 60 may identify the focus thief, i.e., the application or process that has stolen focus from the target of the failed RPA activity, thus causing the automation malfunction. As described above, when the focus thief comprises another process executing concurrently with the RPA target application, the identity (e.g., handle) of the respective process may be determined by inspecting specific data structures of the OS. In the case of a web page overlay, step 814 may determine a handle and/or other characteristics of the respective overlay for instance according to a content of the DOM. The identified window handle may further enable robot troubleshooter 60 to determine other characteristics such as a type of application (e.g., Microsoft Excel®, Firefox® browser, etc.) and a user/owner of the respective process/application. In some embodiments, troubleshooter 60 may determine for instance whether the focus thief comprises another instance of an RPA robot executing concurrently on RPA client 12. Such determinations may include looking up a username/owner of the focus thief entity and relying on the observation that instances of RPA robot 22 may execute under a system or service account, as opposed to a regular user of the respective host computer. Alternatively or additionally, some embodiments may determine whether the focus thief comprises an RPA robot by corroborating robot scheduling/job data obtained from RPA conductor 24. For instance, conductor 24 may receive identifiers (e.g., process IDs) of all RPA robots executing on RPA client 12 as part of a heartbeat communication/status report 55a. The respective information may then be used by robot troubleshooter 60 to determine whether focus stealing was caused by an RPA robot.

In some embodiments, if step 812 returns a NO, in a further step 820 troubleshooter 60 may run an extra set of checks to determine whether the cause of failure may have been a rogue window. Stated otherwise, the current automation may have failed because a rogue pop-up window got in the way of the current RPA activity, even though it did not steal focus from the automation target. Rogue window detection heuristics may include AI-driven image-processing methods as described above. When a rogue window is detected (a step 822 returns a YES), a further step 824 may identify a culprit software entity displaying the rogue window. Step 824 may employ similar methods to those used in step 814 described above.

The identity of the focus thief or of the software entity that caused a display of a rogue window provides valuable guidance to automation designers and supervisors for avoiding future incidents of a similar nature. For instance, the automation supervisor may adjust future scheduling and job assignment so that other robots do not interfere with the current type of automation. Automation designers may also tweak the specification of the respective workflows to account for particular types of focus stealing events.

In a sequence of steps 816-818, troubleshooter 60 may then formulate troubleshooting report 65 and transmit report 65 to RPA conductor 24. In some embodiments, report 65 includes at least an indicator of an event type (e.g., focus steal, rogue window) causing the current automation failure and an identifier of the culprit (i.e., software entity causing the focus theft and/or rogue window display), when available.

Step 816 may further classify the current focus stealing/rogue window event into a set of pre-determined event categories according to an identity of the culprit entity and/or content (e.g., text) displayed within the respective focus stealing/rogue window. Exemplary troubleshooting categories include "OS dialog", "Software update notification", "Calendar notification", "Browser cookie notice", "Advertisement", "Browser warning", etc. (Category names are only exemplary.) Alternatively or additionally, some reports 65 further specify a type/category of window (e.g., OS dialog, browser overlay, etc.) causing the respective failure. Such event and window category assignments may facilitate troubleshooting and assist automation designers in improving robot design by addressing the respective focus theft or rogue window pop-up situations.

Troubleshooting report data may then be communicated to a user, for instance displayed on an output device/screen of RPA client 12 and/or displayed within a web interface of RPA conductor 24.

FIG. 10 shows such an exemplary automation failure notification 70a according to some embodiments of the present invention. The content and visual organization of the illustrated notification are only exemplary and not meant to be limiting. Notification 70a identifies the RPA activity that failed to execute and a stage at which the failure occurred. Further displayed is an indicator 72a of a reason for failure (focus theft), an identifier 74a of a culprit entity (browser identified by a make, version, and a process ID), and further providing useful context in the form of a window category indicator (page overlay, cookie warning, etc.). Alternatively or additionally, culprit identifier 74a may indicate a user/owner of the respective culprit entity, as identified for instance by a user ID or username, a location/path of the culprit software entity, etc. In some embodiments as illustrated, failure notification 70a further includes suggestions for solving the current problem and/or suggestions for improving robot design. To provide such feedback and suggestions to the automation designers and/or supervisors, some embodiments maintain a mapping associating a plurality of automation failure event types with appropriate corrective/mitigation actions. Notification 70a may further include actionable controls (e.g., a set of clickable buttons as illustrated) for automatically carrying out the suggested corrective actions. When such controls are included, the respective corrective actions may be carried out by local RPA drivers 25.

Some advanced embodiments may implement a self-healing procedure wherein robot troubleshooter 60 may attempt to automatically repair the failed automation. In one such example, troubleshooter 60 may actively use the handle of the window currently in focus and/or the identity of the focus thief determined in step 814 (or rogue window identified in step 824) to manipulate the current state of RPA client 12 to return focus to the target window and then resume the current automation. In the exemplary situation illustrated in FIG. 6, troubleshooter 60 may employ RPA driver 25 to automatically return focus to target window 62e, for instance by clicking/tapping inside the spreadsheet. Alternatively, troubleshooter 60 may automatically close the window currently in focus (i.e., focus stealing window 62f) for instance by identifying and clicking the "Cancel" button.

In the exemplary situation illustrated in FIG. 7, step 814 may return a handle to the focus-stealing overlay 62g. Troubleshooter 60 may then collaborate with in-browser instance of RPA driver 25 to parse the current DOM and further identify any controls for closing the respective browser overlay and thus return focus to the intended RPA target window 62f. For instance, troubleshooter 60 may instruct driver 25 to identify and automatically click the "Accept" button. To carry out such robot self-healing procedures, some embodiments of troubleshooter 60 may collaborate with remote AI image processors as described above, for instance to identify clickable buttons, etc.

Embodiments Detecting a File Lock

Potential causes of an automation malfunction further comprise a file lock. File locking is a mechanism that temporarily restricts access to a computer file to only one user or process. In typical file locking, a process may place a lock on a file to prevent other concurrent processes to read, modify, or delete it until the respective lock is removed. Some implementations allow sharing the lock between multiple entities, while ensuring that only members of the respective group of entities have access to the respective file for the duration of the locking. File locking is typically implemented and enforced at the level of the operating system, and the details of such the file locking mechanism are OS-specific.

An RPA may fail due to an unexpected file lock, for instance in a situation wherein a robot tasked with reading from or writing to a file is unable to do it because the respective file is currently locked by another user or application. Such situations may arise especially when RPA client 12 is shared between multiple users, or in complex automations wherein multiple robots concurrently access the same target object, such as a corporate database among others.

In some embodiments, troubleshooter 60 is configured to detect file locking and inform the user on the cause of an automation failure. FIG. 11 shows an exemplary sequence of steps performed by troubleshooter module 60 according to some embodiments of the present invention. As described above in relation to FIG. 8, module 60 may detect an automation failure either by inspecting a current state of robot 22 or via notifications received from robot 22. Alternatively, module 60 may receive a notification of failure from RPA conductor 24, which is typically aware of the state of each robot in its supervision. In a sequence of steps 1102-1104 troubleshooter 60 may wait for a notification of failure. When an automation failure is detected, a step 1106 may determine which RPA activity of the current workflow failed to execute and a time of occurrence of the respective malfunction. In some embodiments, a step 1108 performs a preliminary filtering to determine whether the current failure could have been caused by an inadvertent file lock. Step 1108 may apply a set of heuristics according to a type of RPA activity (activities that involve opening, reading from and writing to a file, database, etc., are likely to be affected by a file lock, while activities such as clicking a UI button may not), a type of activity target (e.g., spreadsheet cell vs. UI button), a type of target application (e.g., Microsoft Excel® vs. a web browser), the date and/or time of the malfunction, etc.

If step 1108 returns a YES, in a step 1110 some embodiments will execute a set of file lock detection procedures. Multiple procedures may be applied in sequence, for instance as part of a decision tree. Alternatively, several procedures may be applied independently of each other, and their results may be combined, e.g., by way of a weighted scoring system.

File lock detection procedures may vary according to hardware and software details of RPA client 12, e.g., according to a type and version of an operating system. In some embodiments, a basic file lock detection procedure comprises identifying a computer file affected by the failed RPA activity and determining whether the respective file is currently locked. The identity (e.g., file name, path) of a file targeted by the respective automation may be determined according to a specification of the RPA workflow (e.g., a content of RPA package 50) or by collaborating with robot 22. To determine whether the respective file target file is locked, some embodiments use the observation that to lock a file, a process typically has to register the respective file as a resource. For instance, on Windows® platforms, handles to files used by a process are listed within a handle table of the respective process, which is a data structure used by the OS to manage execution of the respective process. Some embodiments therefore enumerate all currently executing processes, and for each such process look up the file handles registered with the respective process, thus identifying which processes use the target file. Alternatively, some embodiments may use various available utilities, such as the Handle function forming a part of the Sysinternals API for Windows®. Similar utilities exist for other OSs, such as fstat and lslocks from the util-linux package for Linux®. Once a handle of the respective target file is known, some embodiments determine whether the file is currently locked according to selected attributes of the respective handle. If the target file is currently locked, some embodiments may conclude that a file lock caused the malfunction.

However, merely determining that the target file is currently locked may not be enough for concluding that the cause of failure of the current automation was an inadvertent file lock. The file may have been locked by robot 22 itself in the course of executing the current automation. Therefore, some embodiments determine whether the cause of failure comprises a file lock further according to an identity of the process that currently uses the file. For instance, some embodiments conclude that the automation failed because of a file lock only when the process having locked the file does not belong to, or is not a descendant of, RPA robot 22.

More sophisticated file lock detection procedures may rely on the further observation that a file may be repeatedly locked and unlocked, sometimes by distinct entities. Such situations arise for instance when multiple users and/or RPA robots access the respective file. Therefore, simply detecting that the target file is currently locked does not necessarily reveal the cause of the automation malfunction, i.e., which process had a lock on the target file at the moment of failure.

To address such situations, another exemplary file lock detection procedure comprises setting up an event log associated with the respective target file, the event log storing a time record of each locking and/or unlocking of the respective target file, including a time stamp of each event and an identifier of the process causing the respective lock/unlock. Such an event log may be set up by troubleshooter 60 at the start of the current automation, and may be implemented using event logging method known in the art. On a Windows platform, a file lock event log may be set up using a file auditing mechanism of the OS. In response to detecting the automation failure, some embodiments may parse the event log according to a time stamp of the failure, and determine which entity/process (if any) had a lock on the respective file at the respective time. Some embodiments may then apply some process identification heuristics to determine whether the respective file lock caused the failure according to whether the entity holding the lock is related to RPA robot 22 or not.

When a determination was made that a file lock was indeed the cause of failure (a step 1112 returns a YES), in a further step 1114 troubleshooter 60 may identify the entity causing the automation malfunction (herein deemed file locking culprit). As described above, on some platforms/operating systems the process having a lock on the target file is automatically identified as part of detecting the file lock itself. Step 1114 may return a handle to the respective process, which may further enable robot troubleshooter 60 to determine other characteristics such as a type of application the respective process belongs to (e.g., Microsoft Excel®, Firefox® browser, etc.) and a user/owner of the respective process/application. In some embodiments, troubleshooter 60 may determine for instance whether the file locking culprit comprises another instance of an RPA robot executing concurrently on RPA client 12. Such determinations may include looking up a username/owner of the file locking culprit and relying on the observation that instances of RPA robot 22 may execute under a system or service account, as opposed to a regular user of the respective host computer. Alternatively or additionally, some embodiments may determine whether the file locking culprit comprises a robot instance by corroborating robot scheduling/job data obtained from RPA conductor 24. Conductor 24 may receive identifiers (e.g., process IDs) of all RPA robots executing on RPA client 12 as part of a heartbeat communication/status report 55a. The respective information may then be used by robot troubleshooter 60 to determine whether a respective file lock was caused by an RPA robot. Other exemplary embodiments may carry out an in-depth forensic investigation of file locking incidents comprising, in response to determining an entity currently having a lock on the target file, looking up an ancestor entity of the file locking entity and if the ancestor entity is an instance of an RPA robot, determining that the file locking culprit is a robot.

The identity of the culprit software entity provides valuable guidance to automation designers and supervisors for avoiding future incidents of a similar nature. For instance, the automation supervisor may adjust future scheduling and job assignment so that other robots do not interfere with the current type of automation. Automation designers may also tweak the specification of the current workflow to address the problem of file access conflicts, etc.

In a sequence of steps 1116-1118, troubleshooter 60 may then formulate troubleshooting report 65 and transmit report 65 to RPA conductor 24. In some embodiments, report 65 includes at least an indicator of an event type (e.g., file lock)

causing the current automation failure and an identifier of the entity having placed the respective file lock, when available. Troubleshooting report data may then be communicated to a user, for instance displayed on an output device/screen of RPA client 12 and/or displayed within a web interface of RPA conductor 24.

Figure 12:
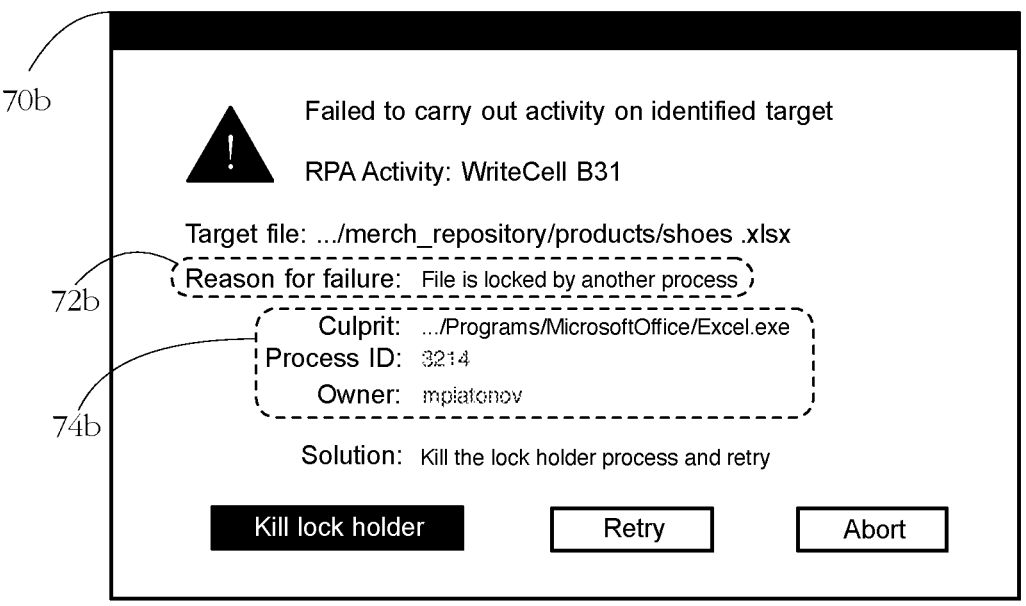
FIG. 12 shows another exemplary failure notification according to some embodiments of the present invention.

FIG. 12 shows such an exemplary automation failure notification 70b according to some embodiments of the present invention. The content and visual organization of the illustrated notification are only exemplary and not meant to be limiting. Notification 70b identifies the RPA activity that failed to execute and a stage at which the failure occurred. Further displayed is an indicator 72b of a reason of the respective automation failure, and indicators 74b of a culprit entity/process having caused the respective failure. In some embodiments as illustrated, failure notification 70b further includes suggestions for solving the current problem and/or suggestions for improving robot design. To provide such feedback and suggestions to the automation designers and/or supervisors, some embodiments maintain a mapping associating a plurality of automation failure event types with appropriate corrective/mitigation actions. Notification 70b may further include actionable controls (e.g., a set of clickable buttons as illustrated) for carrying out the suggested corrective actions.

Some advanced embodiments may implement a self-healing procedure wherein robot troubleshooter 60 may attempt to automatically repair the failed automation. In one such example, troubleshooter 60 may actively use the identifier/handle of a process currently holding the target file under lock to return RPA client 12 to a state wherein the failed automation can resume. For instance, troubleshooter 60 may employ RPA driver 25 to automatically kill the process currently holding the target file under lock, thus removing the lock. Troubleshooter 60 may then collaborate with RPA robot 22 to resume the current automation by retrying to execute the previously failed RPA activity.

In some embodiments, file lock detection may be combined with focus theft detection, based on the observation that on some platforms and for some automation target applications, attempting to access a locked file may cause a display of a warning/dialog window, which may steal focus from the automation target. Therefore, simply removing the file lock and resuming the automation may immediately result in another failure due to the described focus theft. Some embodiments may therefore automatically execute focus theft detection/mitigation procedures in response to a file lock detection.

Figure 13:
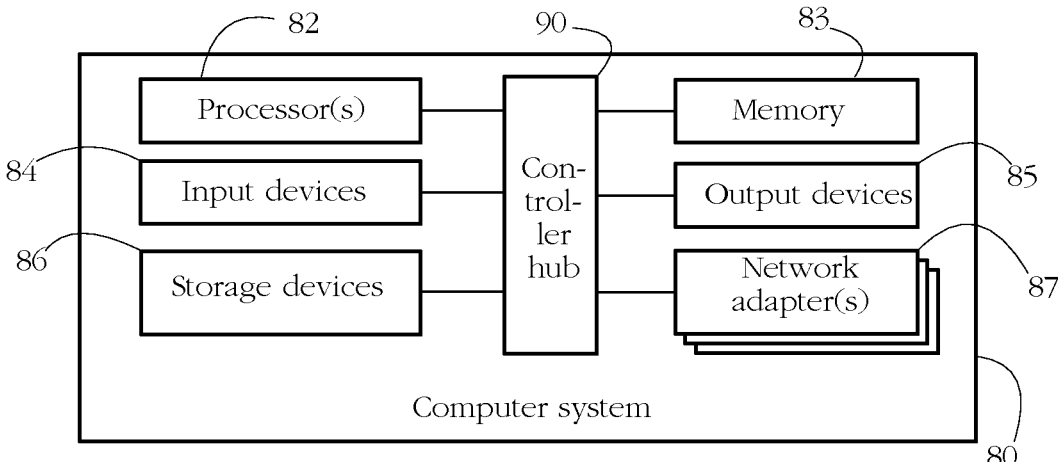
FIG. 13 shows an exemplary hardware configuration of a computer system programmed to execute some of the methods described herein.

FIG. 13 shows an exemplary hardware configuration of a computer system 80 programmed to execute some of the methods described herein. Computer system 80 may represent any of RPA clients 12a-c, as well as RPA server(s) 32. The illustrated appliance is a personal computer; other computer systems such as servers, mobile telephones, tablet computers, and wearable computing devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 83 may comprise volatile computer-readable media (e.g. dynamic random-access memory-DRAM) storing data and/or instruction encodings accessed or generated by processor(s) 82 in the course of carrying out operations. Input devices 84 may include computer keyboards, mice, trackpads, and microphones, among others, including the respective hardware interfaces and/or adapters allowing a user to introduce data and/or instructions into computer system 80. Output devices 85 may include display devices such as monitors and speakers among others, as well as hardware interfaces/adapters such as graphic cards, enabling the respective computing device to communicate data to a user. In some embodiments, input and output devices 84-85 share a common piece of hardware (e.g., a touch screen). Storage devices 86 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 87 include mechanical, electrical, and signaling circuitry for communicating data over physical links coupled to an electronic communication network (e.g, FIG. 3) and/or to other devices/computer systems. Adapter(s) 87 may be configured to transmit and/or receive data using a variety of communication protocols.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 83, and/or a southbridge connecting processor 82 to devices 84, 85, 86, and 87.

The exemplary systems and methods described above facilitate the design and operation of RPA systems, making RPA technology more accessible to users lacking specialized programming skills. Conventional RPA typically requires a substantial breadth of knowledge in the art of computer technology. On the robot design side, successful RPA requires at least knowledge of RPA design software, user interfaces, and web technologies. In turn, efficiently deploying and successfully executing RPA robots increasingly requires extensive knowledge of cloud computing. Complex RPA projects involving a collaboration and coordination between multiple robots and workflows may necessitate a whole team of professionals, with distinct team members having distinct competences, skills, and roles. Consequently, the barrier to accessing the true benefits of RPA has so far been relatively high, both in terms of costs and technical skills. There is therefore a strong incentive to make RPA technology more user-friendly and accessible to citizen developers that lack specialized computing skills.

One particular aspect of RPA that has the potential to massively reduce said access barrier is troubleshooting. When automations fail, conventional RPA typically provides very little information on the causes of the respective failure, especially when automations run remotely as in many cloud computing applications. The causes of failure may vary according to hardware and software particularities of the respective computing platform, as well as other factors such as the computing load on the respective machines, and even the date and time of the day. Sometimes the exact circumstances of the respective failure may not be known and may be difficult to reproduce after the fact. Overall, finding the cause of an automation failure may therefore be a lengthy process requiring skilled operators and causing costly downtime and maintenance.

Frequent causes of automation malfunctions include UI focus stealing and file locking. Focus stealing typically affects automations requiring interacting with various elements of a target user interface, such as clicking on buttons and filling out online forms. To automatically carry out such activities, an RPA robot must identify the respective UI element within a specific window of the UI. If the target window inadvertently loses focus during execution of the respective activity, the robot will likely fail to identify its intended target and/or to act on the respective target. Possible causes of focus theft include the sudden appearance of a pop-up window (e.g. an OS dialog, an error message, a calendar notification, etc.). A similar focus theft may occur within a browser, with an inadvertent privacy notification, product advert, etc., suddenly obscuring the target of the current automation.

File locking may affect automations that target a content of a target file such as a spreadsheet, a database, etc. When an exemplary automation requires writing to a selected spreadsheet cell, the RPA robot may unexpectedly fail to execute the writing activity because the respective file is locked by another application or user. Such situations may occur especially on computing platforms that are shared between multiple users and/or RPA robots.

Both focus theft and file locking pose particular troubleshooting challenges because the failures they cause are sporadic and apparently inconsistent—the same automation may run repeatedly with no problems at all, and then suddenly fail. Furthermore, the cause of the failure may not be obvious because the conditions that enabled the respective failure to occur have changed between the time of occurrence of the respective malfunction and the time of investigation. For instance, the process that was holding the target process under lock has since been terminated, so the file lock is no longer there.

Some embodiments of the present invention explicitly address such challenges by placing a troubleshooting module on the RPA host machine that executes the RPA robot.

The troubleshooter detects automation malfunctions and carries out a forensic investigation to determine a cause of failure. Detailed descriptions of embodiments and methods of detecting focus theft and file locking are described above. To carry out such forensic investigations, some embodiments of the troubleshooter collaborate with the local instance of an RPA driver and/or with an RPA conductor that orchestrates the operation of multiple robots.

In response to determining a cause of failure (e.g., focus stealing, file locking, etc.), some embodiments communicate results of the forensic analysis to a user, for instance by displaying a failure notification on a screen of the RPA host machine and/or within an administration interface of the RPA conductor. A failure notification according to some embodiments of the present invention may include an indicator of the cause of failure together with an indicator/identifier of the entity that caused the respective failure (e.g., description of a pop-up window in the case of focus theft, the process ID/path of the process that locked the target file in the case of a file lock). For instance, some embodiments may determine whether the malfunction was caused by another instance of RPA robot executing concurrently on the same host, and communicate such data to the user. Such troubleshooting information enables automation designers and supervisors to quickly determine the cause of an automation failure and to implement a strategy for avoiding such failures in the future, either by changing the scheduling of automations on the respective host, or by altering the specification of the failed workflow/automation to explicitly address situations which had caused the current malfunction.

Some embodiments of the automation troubleshooter further implement a robot self-healing procedure, wherein the results of the forensic investigation are used to change the state of the local RPA host so that the failed automation can be resumed or re-executed. In one such example, the troubleshooter module determines a handle of a browser overlay that stole focus from a target web page, and uses the local instance of RPA driver to automatically close the offending overlay and resume the respective automation. In another example, the troubleshooter module determines an identifier (e.g. handle/process ID) of an entity that currently has a lock on a file targeted by the current automation, and automatically kills the respective entity before resuming the RPA workflow.

It will be clear to one skilled in the art that the above embodiments may be altered in many ways without departing from the scope of the invention. Accordingly, the scope of the invention should be determined by the following claims and their legal equivalents.

The invention claimed is:

1. A computer system comprising at least one hardware processor configured to execute a troubleshooter module communicatively coupled to a robotic process automation (RPA) robot configured to execute an RPA activity mimicking a human interaction with a user interface (UI) exposed by the computer system, the troubleshooter module configured to troubleshoot the RPA activity, comprising:

in response to a failure of the RPA robot to execute the RPA activity, determining whether the failure was caused by UI focus theft according to a content of a data structure representing the UI in a memory of the computer system;

in response to determining that the failure was caused by UI focus theft, identifying a culprit software entity causing the UI focus theft; and initiating a display of a failure notification to a user, the failure notification including an indicator of a cause of the failure and an identifier of the culprit software entity.

2. The computer system of claim 1, wherein determining whether the failure was caused by UI focus theft comprises identifying within the UI a window currently in focus.

3. The computer system of claim 2, wherein the RPA activity comprises acting on an element displayed within a target window of the UI, and wherein determining whether the failure was caused by UI focus theft comprises determining whether the window currently in focus coincides with the target window.

4. The computer system of claim 2, wherein identifying the window currently in focus comprises:

transmitting a screenshot showing at least a part of the UI to an image-processing artificial intelligence (AI) module pre-trained to detect UI windows present within the screenshot; and receiving from the AI module a descriptor of the window currently in focus.

5. The computer system of claim 1, wherein determining whether the failure was caused by UI focus theft comprises identifying within the UI a window having focus at a time of the failure.

6. The computer system of claim 5, wherein:

the troubleshooter module is configured to construct an event log comprising a time record of UI focus change events having occurred within the UI, the event log comprising, for each UI focus change event, a time of occurrence of the respective event and an identifier of a window receiving focus in response to the respective event; and identifying the window having focus at the time of the failure comprises:

determining the time of the failure according to an output of the RPA robot, and parsing the event log according to the time of the failure.

7. The computer system of claim 1, wherein:

the failure notification is displayed within a user interface of an RPA conductor orchestrating the execution of multiple RPA robots including the RPA robot; and initiating the display of the failure notification comprises transmitting a troubleshooting report to the RPA conductor, the troubleshooting report including the indicator of the cause of the failure and the identifier of the culprit software entity.

8. The computer system of claim 1, wherein:

the RPA activity comprises acting on a UI element displayed within a target window of the UI;

the troubleshooter module is further configured to identify a focus stealing window comprising a window of the UI stealing focus from the target window; and the failure notification is further indicative of a content of the focus stealing window.

9. The computer system of claim 8, wherein the target window comprises a web browser window displaying a target web page and wherein the focus stealing window comprises an overlay obscuring at least a part of the target web page.

10. The computer system of claim 8, wherein the content of the focus stealing window comprises an item selected from a group consisting of an error message, a software update notification, a calendar notification, and a notification of an incoming message.

11. A robotic process automation (RPA) troubleshooting method comprising employing at least one hardware processor of a computer system to execute a troubleshooter module communicatively coupled to an RPA robot configured to execute an RPA activity mimicking a human interaction with a user interface (UI) exposed by the computer system, wherein executing the troubleshooter module comprises:

in response to a failure of the RPA robot to execute the RPA activity, determining whether the failure was caused by UI focus theft according to a content of a data structure representing the UI in a memory of the computer system;

in response to determining that the failure was caused by UI focus theft, identifying a culprit software entity causing the UI focus theft; and initiating a display of a failure notification to a user, the failure notification including an indicator of a cause of the failure and an identifier of the culprit software entity.

12. The method of claim 11, wherein determining whether the failure was caused by UI focus theft comprises identifying within the UI a window currently in focus.

13. The method of claim 12, wherein the RPA activity comprises acting on an element displayed within a target window of the UI, and wherein determining whether the failure was caused by UI focus theft comprises determining whether the window currently in focus coincides with the target window.

14. The method of claim 12, wherein identifying the window currently in focus comprises:

transmitting a screenshot showing at least a part of the UI to an image-processing artificial intelligence (AI) module pre-trained to detect UI windows present within the screenshot; and receiving from the AI module a descriptor of the window currently in focus.

15. The method of claim 11, wherein determining whether the failure was caused by UI focus theft comprises identifying within the UI a window having focus at a time of the failure.

16. The method of claim 15, wherein:

the troubleshooter module is configured to construct an event log comprising a time record of UI focus change events having occurred within the UI, the event log comprising, for each UI focus change event, a time of occurrence of the respective event and an identifier of a window receiving focus in response to the respective event; and identifying the window having focus at the time of the failure comprises:

determining the time of the failure according to an output of the RPA robot, and parsing the event log according to the time of the failure.

17. The method of claim 11, wherein:

the failure notification is displayed within a user interface of an RPA conductor orchestrating the execution of multiple RPA robots including the RPA robot; and initiating the display of the failure notification comprises transmitting a troubleshooting report to the RPA conductor, the troubleshooting report including the indicator of the cause of the failure and the identifier of the focus thief.

18. The method of claim 11, wherein:

the RPA activity comprises acting on a UI element displayed within a target window of the UI;

the troubleshooter module is further configured to identify a focus stealing window comprising a window of the UI stealing focus from the target window; and the failure notification is further indicative of a content of the focus stealing window.

19. The method of claim 11, wherein the target window comprises a web browser window displaying a target web page and wherein the focus stealing window comprises an overlay obscuring at least a part of the target web page.

20. The method of claim 11, wherein the content of the focus stealing window comprises an item selected from a group consisting of an error message, a software update notification, a calendar notification, and a notification of an incoming message.

21. A non-transitory computer-readable medium storing instructions which, when executed by at least one hardware processor of a computer system, cause the computer system to execute a troubleshooter module communicatively coupled to a robotic process automation (RPA) robot configured to execute an RPA activity mimicking a human interaction with a user interface (UI) exposed by the computer system, the troubleshooter module configured to troubleshoot the RPA activity, comprising:

in response to a failure of the RPA robot to execute the RPA activity, determining whether the failure was caused by UI focus theft according to a content of a data structure representing the UI in a memory of the computer system;

in response to determining that the failure was caused by UI focus theft, identifying a culprit software entity causing the UI focus theft; and initiating a display of a failure notification to a user, the failure notification including an indicator of a cause of the failure and an identifier of the culprit software entity.

* * * * *